United States Patent
Kras et al.

(10) Patent No.: US 11,269,994 B2
(45) Date of Patent: Mar. 8, 2022

(54) SYSTEMS AND METHODS FOR PROVIDING CONFIGURABLE RESPONSES TO THREAT IDENTIFICATION

(71) Applicant: KnowBe4, Inc., Clearwater, FL (US)

(72) Inventors: Greg Kras, Dunedin, FL (US); Adam Alessandrini, Clearwater, FL (US)

(73) Assignee: KnowBe4, Inc., Clearwater, FL (US)

( * ) Notice: Subject to any disclaimer, the term of this patent is extended or adjusted under 35 U.S.C. 154(b) by 0 days.

(21) Appl. No.: 17/168,779

(22) Filed: Feb. 5, 2021

(65) Prior Publication Data

US 2021/0248229 A1    Aug. 12, 2021

Related U.S. Application Data

(60) Provisional application No. 62/971,303, filed on Feb. 7, 2020.

(51) Int. Cl.
*G06F 21/55* (2013.01)
*H04L 51/08* (2022.01)
*H04L 29/06* (2006.01)
*G09B 19/00* (2006.01)

(52) U.S. Cl.
CPC ....... *G06F 21/552* (2013.01); *G09B 19/0053* (2013.01); *H04L 51/08* (2013.01); *H04L 63/1483* (2013.01)

(58) Field of Classification Search
CPC ... G06F 21/552; G09B 19/0053; H04L 51/08; H04L 63/1483
See application file for complete search history.

(56) References Cited

U.S. PATENT DOCUMENTS

| 7,532,890 | B2 * | 5/2009 | Davies | ............. H04L 51/24 370/395.5 |
| 8,176,321 | B1 * | 5/2012 | Perry | ............. H04L 67/2842 713/167 |
| 8,578,468 | B1 * | 11/2013 | Yadav | ............. H04L 63/20 726/13 |
| 8,615,807 | B1 | 12/2013 | Higbee et al. | |
| 8,635,703 | B1 | 1/2014 | Belani et al. | |
| 8,719,940 | B1 | 5/2014 | Higbee et al. | |
| 8,910,287 | B1 | 12/2014 | Belani et al. | |
| 8,966,637 | B2 | 2/2015 | Belani et al. | |

(Continued)

FOREIGN PATENT DOCUMENTS

WO    WO-2016/164844 A1    10/2016

*Primary Examiner* — Oleg Korsak
(74) *Attorney, Agent, or Firm* — Foley & Lardner LLP

(57) ABSTRACT

Systems and methods are described for providing customized message content to be displayed to a user of an email client, responsive to the user selecting, via a plug-in or agent of the email client, to report an email as a potential phishing email. In examples, the user may be an employee of an organization and the systems and methods may facilitate a determination by the plug-in or agent of the email client that the reported email is one that does not pose a security risk, such as a simulated phishing email sent by the organization itself, or an email sent from a trusted partner of the organization. The systems and methods may facilitate a customization of the message content that is displayed to the user. In examples, the customized message content may be included or specified within one or more SMTP extension headers of an SMTP email.

20 Claims, 19 Drawing Sheets

(56) References Cited

U.S. PATENT DOCUMENTS

| | | |
|---|---|---|
| 9,053,326 B2 | 6/2015 | Higbee et al. |
| 9,124,625 B1 * | 9/2015 | Seger ............... G06F 21/552 |
| 9,215,239 B1 * | 12/2015 | Wang ............... G06F 21/566 |
| 9,246,936 B1 | 1/2016 | Belani et al. |
| 9,253,207 B2 | 2/2016 | Higbee et al. |
| 9,262,629 B2 | 2/2016 | Belani et al. |
| 9,325,730 B2 | 4/2016 | Higbee et al. |
| 9,356,948 B2 | 5/2016 | Higbee et al. |
| 9,398,038 B2 | 7/2016 | Higbee et al. |
| 9,591,017 B1 | 3/2017 | Higbee et al. |
| 9,667,645 B1 | 5/2017 | Belani et al. |
| 9,876,753 B1 | 1/2018 | Hawthorn |
| 9,882,924 B2 * | 1/2018 | McDougal ............. H04L 51/12 |
| 9,912,687 B1 | 3/2018 | Wescoe et al. |
| 9,998,523 B2 * | 6/2018 | Lee ..................... H04L 67/06 |
| 10,021,128 B2 * | 7/2018 | McDougal ........... G06F 16/116 |
| 10,243,904 B1 | 3/2019 | Wescoe et al. |
| 10,250,543 B2 * | 4/2019 | Gnech ................... H04L 51/08 |
| 10,277,542 B2 * | 4/2019 | Bastide ................. H04L 51/10 |
| 2008/0307222 A1 * | 12/2008 | Chow ................... H04L 63/12 713/156 |
| 2009/0158430 A1 * | 6/2009 | Borders ............ H04L 63/1408 726/23 |
| 2011/0154473 A1 * | 6/2011 | Anderson ............. G06F 21/64 726/11 |
| 2012/0331551 A1 * | 12/2012 | van Steenbergen .... H04L 45/02 726/22 |
| 2016/0164898 A1 | 6/2016 | Belani et al. |
| 2016/0301705 A1 | 10/2016 | Higbee et al. |
| 2017/0237776 A1 * | 8/2017 | Higbee ................. G06F 16/35 726/1 |
| 2019/0173819 A1 | 6/2019 | Wescoe et al. |
| 2019/0215335 A1 | 7/2019 | Benishti |
| 2019/0245885 A1 | 8/2019 | Starink et al. |
| 2019/0245894 A1 * | 8/2019 | Epple ................. H04L 63/1425 |

* cited by examiner

```
MIME-Version: 1.0
From: Alice Sender <ASender@This.Host.This.net>
Date: Mon, 11 Feb 2019 16:40:04 +0530
Subject: "Team Meeting Tomorrow"
Message-ID: [alphanumeric ID]

Content-Transfer-Encoding: 7bit
Content-Description: very simple MIME message
Content-ID: current-update@simulation server
Content-Location: 248439/248446
Content-Disposition: inline
Content-Type: plugin/channel; boundary="Instructions"

- - Instructions
Content-Type: text/plain

Simulation email client agent Instructions

Content-Type: text/plain
Content-Disposition: attachment;
                filename="batch.exe"

Attached Simulation email client agent batch file

- - Instructions - -

Content-Transfer-Encoding: 7bit
Content-Type: text/plain; charset=ascii
Body-plain: "Dear Bob
Please be advised that we have a team meeting tomorrow, and it is
your turn to bring donuts.
```

FIG. 6B

SYSTEMS AND METHODS FOR PROVIDING CONFIGURABLE RESPONSES TO THREAT IDENTIFICATION

CROSS-REFERENCE TO RELATED APPLICATION

This application claims priority to and the benefit of U.S. Patent Application No. 62/971,303, titled "SYSTEMS AND METHODS FOR PROVIDING CONFIGURABLE RESPONSES TO THREAT IDENTIFICATION," and filed on Feb. 7, 2020, the contents of all of which are hereby incorporated herein by reference in its entirety for all purposes.

TECHNICAL FIELD

The present disclosure generally relates to systems and methods for communication between a simulation server and a client device comprising a plug-in integrated into an email client installed on the client device for providing configurable responses to a user who has selected to report a simulated phishing email as a phishing email using the plug-in. The systems and methods further relate to providing configurable responses to a user that has selected to report a message from a known trusted partner of an organization as a phishing email using the plug-in.

BACKGROUND

Phishing attacks are one of the most common security challenges that both individuals and organizations face in keeping their confidential information secure. A phishing attack involves an attempt to acquire sensitive information such as login credentials, bank account information, credit card details, personal data, organization's confidential data, etc., often for malicious reasons, possibly by masquerading as a trustworthy entity. One of the common types of phishing is email phishing. Email phishing involves targeting one or more employees of an organization for various malicious intents including covert collection of confidential data. A typical phishing email may include a link and/or an attachment of malicious nature. The link when accessed may lead to a website that performs malicious actions or tricks the user to execute a malicious program. Similarly, the attachment when accessed, may execute a program that performs malicious actions. Malicious actions may be malicious data collection or actions harmful to the normal functioning of a device on which the email was activated, or any other malicious actions capable of being performed by a program or a set of programs.

Organizations have recognized phishing as one of the most prominent threats that can cause serious breach of data including confidential information. Attackers who launch phishing attacks may attempt to evade an organization's security controls and target its employees. To prevent or to reduce the success rate of phishing attacks on employees, organizations may conduct phishing awareness training programs for their employees, along with other security measures. The organizations may operate phishing awareness training programs through their in-house cyber security teams or may utilize external entities to conduct such training, and who are experts in cyber security matters. Through the phishing awareness training, the organizations actively educate their employees on how to spot and report a suspected phishing attempt. In some cases, the employees may be provided with various reporting tools to support the user to report a suspected phishing email. A Phishing Alert Button (PAB) plug-in is one example of such a tool which may be provided to the employees as part of an email client to report the suspected phishing attempt. If an employee receives an email that he or she suspects to be a phishing email, the employee can select to report the email as a suspected phishing email by selecting the email and pressing a button (the PAB) that is provided by the PAB plug-in. To test effectiveness of the training, the organizations may send out simulated phishing emails periodically or occasionally to the employees and observe employee responses to such emails. Based on the responses of the employees to the simulated phishing emails, the organizations may decide on providing additional training.

The PAB plug-in may be configured to identify a simulated phishing email. To enable this identification, the simulated phishing email may include a customized header including specific indicators such as a Campaign Recipient ID (CRID), that the PAB plug-in is configured to read and use to identify the email as a simulated phishing email. In some examples, the CRID may identify both a Campaign ID (an identifier of a simulated phishing campaign) and a recipient ID (an identifier of the individual to which the simulated phishing email was sent). If the reported email is determined by the PAB plug-in (for example via analysis of the CRID) to be a simulated phishing email, the email client may be configured to delete the reported email from the employee's mail inbox and display a message that the email is a simulated phishing email. Otherwise, the email client may be configured to remove the reported email from the inbox and move the reported email to a sandbox or a quarantined inbox. Further, the email client may display a message thanking the employee for selecting to report the suspicious email, and that the email would be analyzed for threats. The reported email may then be forwarded to a threat detection platform or Incident Response (IR) team for triage and further analysis to enable the identification of potential phishing threats and malicious actors.

In some instances, the reported email may not be a phishing email. For example, the reported suspect email could be an email from a trusted partner of the organization or from the organization itself, or from an entity conducting phishing awareness training programs. Further, the email may include information regarding an important (and genuine) action that is to be performed by the employee. However, if the employee has reported the trusted email as a suspected phishing email (for example using the PAB plug-in), the employee will no longer have access to that email as it may have been deleted from the user's inbox and quarantined or sent for threat analysis and triage. This can be problematic to the employee, especially if the email included important actions that the employee needed to perform. For example, a trusted partner of an organization providing employee benefits, may send an email to employees with a subject "Open enrollment period ends this Friday—select your benefits now by clicking on this link!". The employee recognizing the urgency in the tone of the email, may suspect the email to be a phishing email and may select to report the email by clicking on the PAB. As the email did not include any customized header (such as a CRID header), the PAB plug-in may remove the email from the inbox and move it to the quarantined inbox. As a result, the employee may not be able to enroll and select the benefits in a timely manner, which may become detrimental to the employee. In another example, a trusted entity enlisted by the organization for the purposes of conducting phishing awareness training programs may send a reminder to take a training class or a reminder to change a password. The reminders are trusted email messages which may not have a customized header that the PAB plug-in can identify. Therefore, if a user reports such an email, the PAB plug-in may delete the email from the user's inbox and may send the email to the threat platform for analysis and triage. Consequently, the user will not receive the training reminder or the password change request. Although an example of plug-in is described above, executables such as a connector, add-on, add-in and the like, providing phishing reporting features are contemplated herein.

Also, owing to a significant increase in the number of phishing attacks in recent years, the degree of security threats that are posed, and due to increased use of awareness training, many employees may be inclined to adopt a conservative approach and report any emails that they believe could be potentially malicious for their organization. Accordingly, a large number of legitimate or trusted emails may be reported to the threat management systems or Incident Response (IR) teams in addition to those emails that do actually contain real phishing threats. As a result, the burden on the management systems and the IR teams is increased and turnaround times taken to review and analyze the emails and to identify real phishing attacks may be increased. This delay in identifying potential phishing attacks poses a serious risk to the organization's data. Thus, current systems to support reporting and analyzing suspected phishing emails are inefficient and time-intensive.

SUMMARY

Systems and methods are provided for displaying customized content responsive to a user identifying a simulated phishing email as a phishing email. In an example embodiment, a method for displaying customized content responsive to a user identifying a simulated phishing email as a phishing email is described which includes, generating, by a simulation server, a simulated phishing email having one or more Simple Mail Transfer Protocol (SMTP) extension headers comprising a predetermined identifier that identifies the simulated phishing email as a known simulated phishing email generated by the simulation server, and specification of content to display to a user of an entity responsive to a user of an entity identifying the simulated phishing email as a phishing email; communicating, by the simulation server via SMTP, the simulated phishing email to email accounts of a plurality of users of the entity; receiving, by an agent of an email client of a user of the plurality of users of the entity, an indication that the user selected via a user interface element presented via the email client to report as a phishing email the simulated phishing email received at the user's email account; determining, by the agent, that the reported email is a known simulated phishing email generated by the simulation server based on the presence of the predetermined identifier in the one or more SMTP extension headers; generating, by the agent responsive to the determination, a message comprising content specified from the one or more SMTP extension headers; and sending, by the agent responsive to the determination, the generated message to a display for presentation.

In some implementations, the method further includes one or more of deleting, by the agent, the simulated phishing email or communicating, by the agent, to the simulation server that the simulated phishing email was reported by the user as a phishing email.

In some implementations, a first SMTP extension header of the one or more SMTP extension headers includes the predetermined identifier and a second SMTP extension header of the one or more SMTP extension headers includes the specification of content.

In some implementations, the specification of content comprises dynamic fields to be determined and populated by the agent.

In some implementations, the specification of content comprises a pointer to a storage of messages comprising content.

In some implementations, the specification of content identifies content on one of a type or a category of phishing attack.

In some implementations, the specification of content may identify content on a level of one of a user, a template, a campaign or an organization.

In another example embodiment, a method for displaying customized content responsive to a user of an entity identifying an email as a phishing email is described. The method comprises generating, by a simulation server, one or more Simple Mail Transfer Protocol (SMTP) extension headers for the entity, comprising a predetermined identifier that identifies an email as being from a trusted partner of the entity, and specification of content to display to a user of the entity responsive to a user identifying an email as a phishing email; sending, by the simulation server to the mail server of the trusted partner of the entity, the one or more SMTP extension headers to be added, by the mail server of the trusted partner of the entity via SMTP, to emails sent to email accounts of a plurality of users of the entity; receiving, by an agent of an email client of a user of the plurality of users of the entity, an indication that the user selected via a user interface element presented via the email client to report as a phishing email an email received at the user's email account from the mail server of the trusted partner of the entity; determining, by the agent, that the reported email is an email received from a trusted partner of the entity based on the presence of the predetermined identifier in the one or more SMTP extension headers; generating, by the agent responsive to the determination, a message comprising content specified from the one or more SMTP extension headers; and sending, by the agent responsive to the determination the generated message to a display, for presentation.

In some implementation, the method further comprises enabling, by the agent responsive to determining the reported email is an email received from the trusted partner of the entity, the user to take action on the reported email without notifying the simulation server of the reported email.

In some implementations, generating by the simulation server one or more SMTP extension headers for the trusted partner of the entity further comprises encrypting the predetermined identifier that identifies an email as being from the trusted partner of the entity.

In some implementations, one or more SMTP extension headers are added in the email in a way that the one or more SMTP extension headers are not visible to a recipient of the email.

In yet another example embodiment, a system for displaying customized content responsive to a user identifying a simulated phishing email as a phishing email is described. The system comprises one or more processors, coupled to memory of a simulation server configured to: generate a simulated phishing email having one or more Simple Mail Transfer Protocol (SMTP) extension headers comprising a predetermined identifier that identifies the simulated phishing email as a known simulated phishing email generated by the simulation server, and specification of content to display to a user responsive to a user identifying the simulated phishing email as a phishing email; communicate via SMTP, the simulated phishing email to email accounts of a plurality of users of the entity; an agent of an email client of a user of the plurality of users, the agent configured to: receive an indication that the user selected via a user interface element presented via the email client to report the simulated phishing email received at the user's email account as a phishing email; determine that the simulated phishing email is a known simulated phishing email generated by the simulation server based on presence of the predetermined identifier in the one or more SMTP extension headers; generate, responsive to the determination, a message comprising content specified from the one or more SMTP extension headers; and send, responsive to the determination, the generated message to a display for presentation.

In some implementations, the agent is further configured to delete the simulated phishing email and communicate to the simulation server that the simulated phishing email was correctly identified by the user.

In some implementations, a first SMTP extension header of the one or more SMTP extension headers includes the predetermined identifier and a second SMTP extension header of the one or more SMTP extension headers includes the specification of content.

In some implementations, the specification of content comprises dynamic fields to be determined and populated by the agent.

In some implementations, the specification of content comprises a pointer to a storage of messages comprising content.

In some implementations, the specification of content identifies content on one of a type or a category of phishing attack.

In some implementations, the specification of content may identify content on a level of one of a user, a template, a campaign or an organization.

In yet another example embodiment, a system for displaying customized content responsive to a user of an entity identifying an email as a phishing email is described. The system comprises one or more processors, coupled to memory of a simulation server configured to: generate one or more Simple Mail Transfer Protocol (SMTP) extension headers for an entity, comprising a predetermined identifier that identifies an email as being from a trusted partner of the entity, and specification of content to display to a user of the entity responsive to a user identifying an email as a phishing email; communicate to the mail server of the trusted partner of the entity, the one or more SMTP extension headers to be added, by the mail server of the trusted partner of the entity to emails sent via SMTP to email accounts of a plurality of users of the entity; an agent of an email client of a user of the plurality of users, the agent configured to: receive an indication that the user selected via a user interface element presented via the email client to report as a phishing email an email received at the user's email account from the mail server of the trusted partner of the entity; determine that the reported email is an email received from a trusted partner of the entity based on presence of the predetermined identifier in the one or more SMTP extension headers; generate a message comprising content specified from the one or more SMTP extension headers; and send, responsive to the user selecting the user interface element, the generated message to a display, for presentation by the display.

In some implementations, the agent, responsive to determining the reported email is an email received from the trusted partner of the entity, is further configured to enable the user to take action on the reported email without notifying the simulation server of the reported email.

In some implementations, the agent does not delete the reported email that is received from the trusted partner of the entity from user's mail inbox.

In some implementations, the agent does not forward the reported email that is received from the trusted partner of the entity to a threat management system or to an Incident Response (IR) team.

In some implementations, the simulation server is further configured to encrypt the predetermined identifier that identifies an email as being from the trusted partner of the entity.

In some implementations, the mail server of the trusted partner of the entity is configured to encrypt the predetermined identifier that identifies an email as being from the trusted partner of the entity.

Other aspects and advantages of the present solution will become apparent from the following detailed description, taken in conjunction with the accompanying drawings, which illustrate by way of example the principles of the present solution.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 6B depicts another example of an SMTP message comprising specification of content, according to some embodiments.

DETAILED DESCRIPTION

For the purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods for providing configurable responses to threat identification. In particular, section B describes embodiments of systems and methods for providing configurable content responsive to a user identifying a simulated phishing email as a phishing email. Section B further describes embodiments of systems and methods for providing configurable content responsive to a user identifying a email from a known trusted partner of an organization as a phishing email.

A. Computing and Network Environment

Figure 1A:
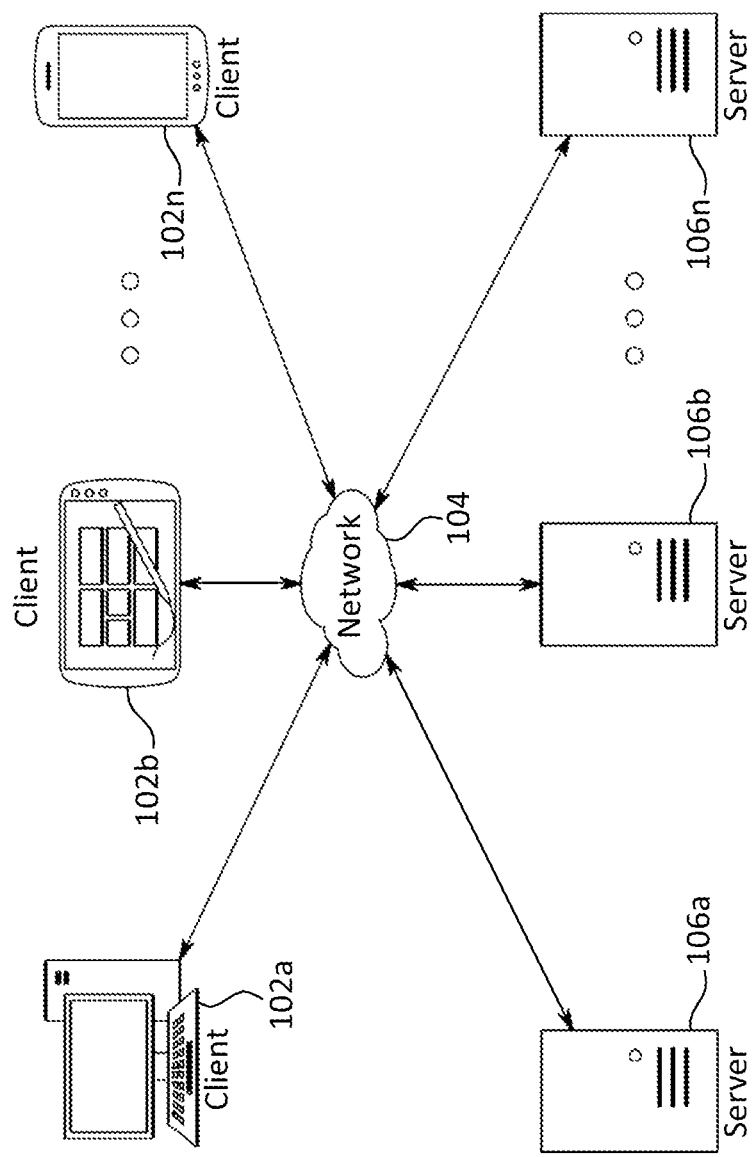
FIG. 1A is a block diagram depicting an embodiment of a network environment comprising client devices in communication with server devices, according to some embodiments.

Prior to discussing specific embodiments of the present solution, it may be helpful to describe aspects of the operating environment as well as associated system components (e.g. hardware elements) in connection with the methods and systems described herein. Referring to FIG. 1A, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, client 102 has the capacity to function as both a client node seeking access to resources provided by a server and as a server providing access to hosted resources for other clients 102a-102n.

Although FIG. 1A shows a network 104 between clients 102 and servers 106, clients 102 and servers 106 may be on the same network 104. In some embodiments, there are multiple networks 104 between clients 102 and servers 106. In one of these embodiments, network 104' (not shown) may be a private network and a network 104 may be a public network. In another of these embodiments, network 104 may be a private network and a network 104' may be a public network. In still another of these embodiments, networks 104 and 104' may both be private networks.

Network 104 may be connected via wired and/or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1xRTT, CDMA-EVDO, LTE, LTE-Advanced, LTE-M1, and Narrowband IoT (NB-IoT). Wireless standards may use various channel access methods, e.g. FDMA, TDMA, CDMA, or SDMA. In some embodiments, different types of data may be transmitted via different links and standards. In other embodiments, the same types of data may be transmitted via different links and standards.

Network 104 may be any type and/or form of network. The geographical scope of the network may vary widely and network 104 can be a body area network (BAN), a personal area network (PAN), a local-area network (LAN), e.g. Intranet, a metropolitan area network (MAN), a wide area network (WAN), or the Internet. The topology of network 104 may be of any form and may include, e.g., any of the following: point-to-point, bus, star, ring, mesh, or tree. Network 104 may be an overlay network which is virtual and sits on top of one or more layers of other networks 104'. Network 104 may be of any such network topology as known to those ordinarily skilled in the art capable of supporting the operations described herein. Network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. Network 104 may be a type of broadcast network, a telecommunications network, a data communication network, or a computer network.

In some embodiments, the system may include multiple, logically-grouped servers 106. In one of these embodiments, the logical group of servers may be referred to as a server farm or a machine farm. In another of these embodiments, servers 106 may be geographically dispersed. In other embodiments, a machine farm may be administered as a single entity. In still other embodiments, the machine farm includes a plurality of machine farms. Servers 106 within each machine farm can be heterogeneous—one or more of servers 106 or machines 106 can operate according to one type of operating system platform (e.g., Windows, manufactured by Microsoft Corp. of Redmond, Wash.), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In this embodiment, consolidating servers 106 in this way may improve system manageability, data security, the physical security of the system, and system performance by locating servers 106 and high-performance storage systems on localized high-performance networks. Centralizing servers 106 and storage systems and coupling them with advanced system management tools allows more efficient use of server resources.

Servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc. of Fort Lauderdale, Fla.; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, Calif. Additional layers of abstraction may include Container Virtualization and Management infrastructure. Container Virtualization isolates execution of a service to the container while relaying instructions to the machine through one operating system layer per host machine. Container infrastructure may include Docker, an open source product whose development is overseen by Docker, Inc. of San Francisco, Calif.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
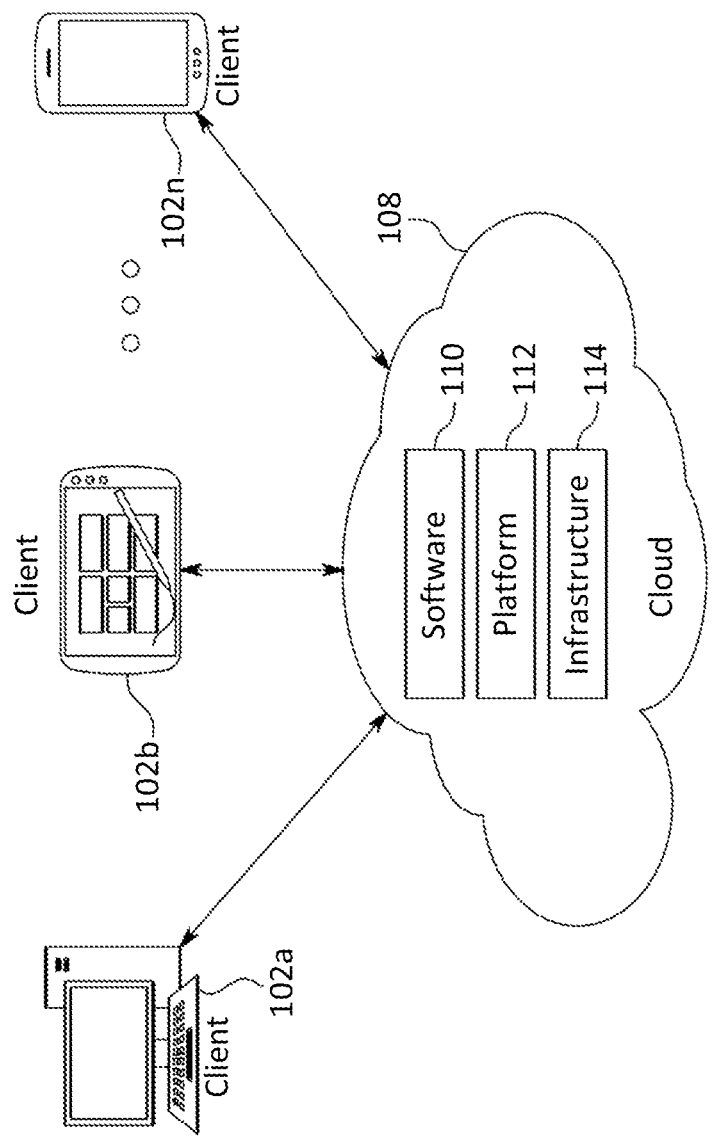
FIG. 1B is a block diagram depicting a cloud computing environment comprising client devices in communication with cloud service providers, according to some embodiments.

Referring to FIG. 1B, a cloud computing environment is depicted. A cloud computing environment may provide client 102 with one or more resources provided by a network environment. The cloud computing environment may include one or more clients 102a-102n, in communication with Cloud 108 over one or more networks 104. Clients 102 may include, e.g., thick clients, thin clients, and zero clients. A thick client may provide at least some functionality even when disconnected from Cloud 108 or servers 106. A thin client or zero client may depend on the connection to Cloud 108 or server 106 to provide functionality. A zero client may depend on Cloud 108 or other networks 104 or servers 106 to retrieve operating system data for client device 102. Cloud 108 may include back end platforms, e.g., servers 106, storage, server farms or data centers.

Cloud 108 may be public, private, or hybrid. Public clouds may include public servers 106 that are maintained by third parties to clients 102 or the owners of the clients. Servers 106 may be located off-site in remote geographical locations as disclosed above or otherwise. Public clouds may be connected to servers 106 over a public network. Private clouds may include private servers 106 that are physically maintained by clients 102 or owners of clients. Private clouds may be connected to servers 106 over a private network 104. Hybrid clouds 109 may include both the private and public networks 104 and servers 106.

Cloud 108 may also include a cloud-based delivery, e.g. Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Wash., Rackspace Cloud provided by Rackspace Inc. of San Antonio, Tex., Google Compute Engine provided by Google Inc. of Mountain View, Calif., or RightScale provided by RightScale, Inc. of Santa Barbara, Calif. PaaS providers may offer functionality provided by IaaS, including, e.g., storage, networking, servers, virtualization or containerization, as well as additional resources, e.g., the operating system, middleware, or runtime resources. Examples of PaaS include Windows Azure provided by Microsoft Corporation of Redmond, Wash., Google App Engine provided by Google Inc., and Heroku provided by Heroku, Inc. of San Francisco Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, Calif., or Office365 provided by Microsoft Corporation. Examples of SaaS may also include storage providers, e.g. Dropbox provided by Dropbox Inc. of San Francisco, Calif., Microsoft OneDrive provided by Microsoft Corporation, Google Drive provided by Google Inc., or Apple iCloud provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources using web-based user interfaces, provided by a web browser (e.g. Google Chrome, Microsoft Internet Explorer, or Mozilla Firefox provided by Mozilla Foundation of Mountain View, Calif.). Clients 102 may also access SaaS resources through smartphone or tablet applications, including e.g., Salesforce Sales Cloud, or Google Drive App. Clients 102 may also access SaaS resources through the client operating system, including e.g. Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Client 102 and server 106 may be deployed as and/or executed on any type and form of computing device, e.g., a computer, network device or appliance capable of communicating on any type and form of network and performing the operations described herein.

Figure 1C:
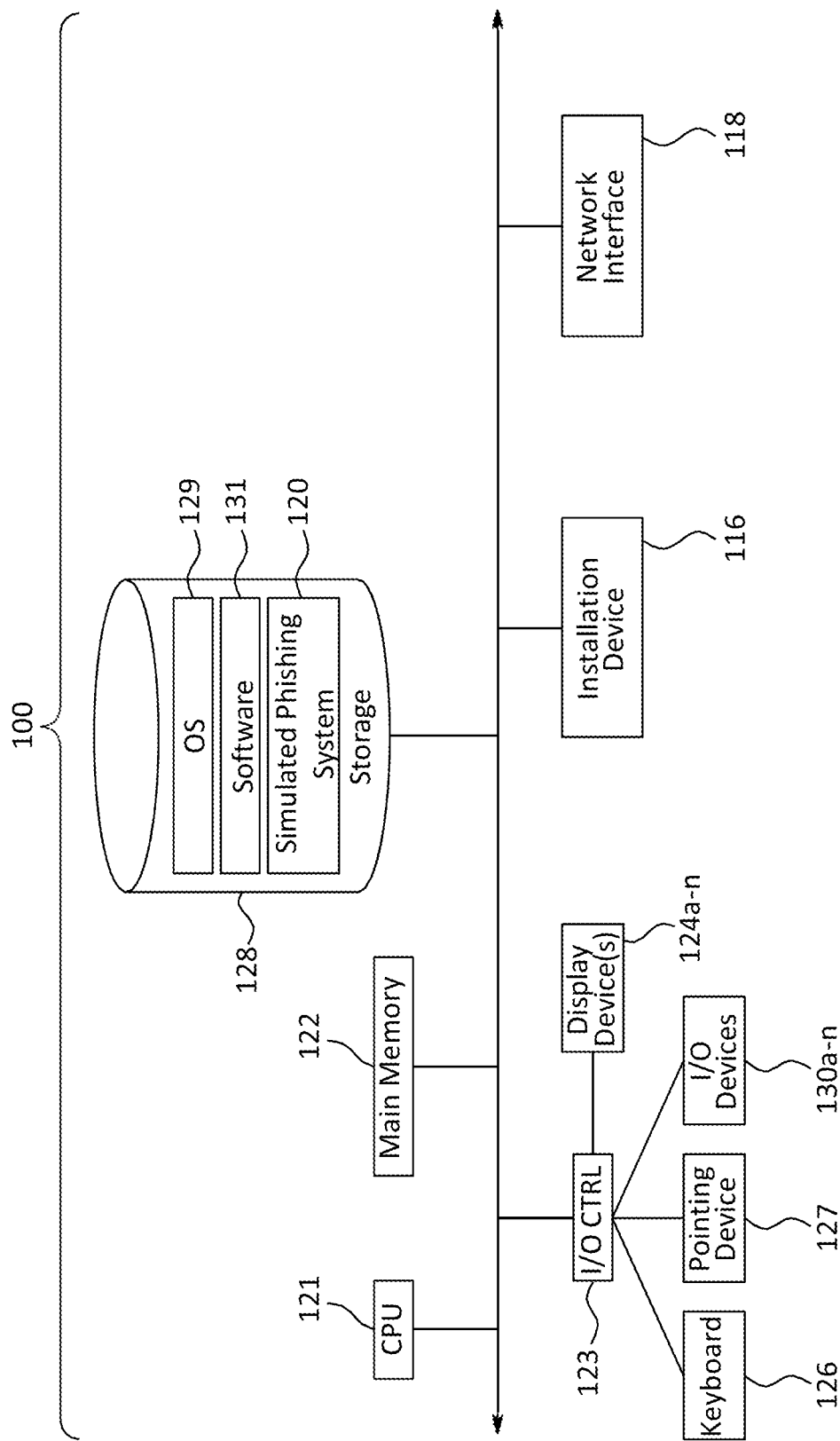
FIGS. 1C and 1D are block diagrams depicting embodiments of computing devices useful in connection with the methods and systems described herein.
Figure 1D:
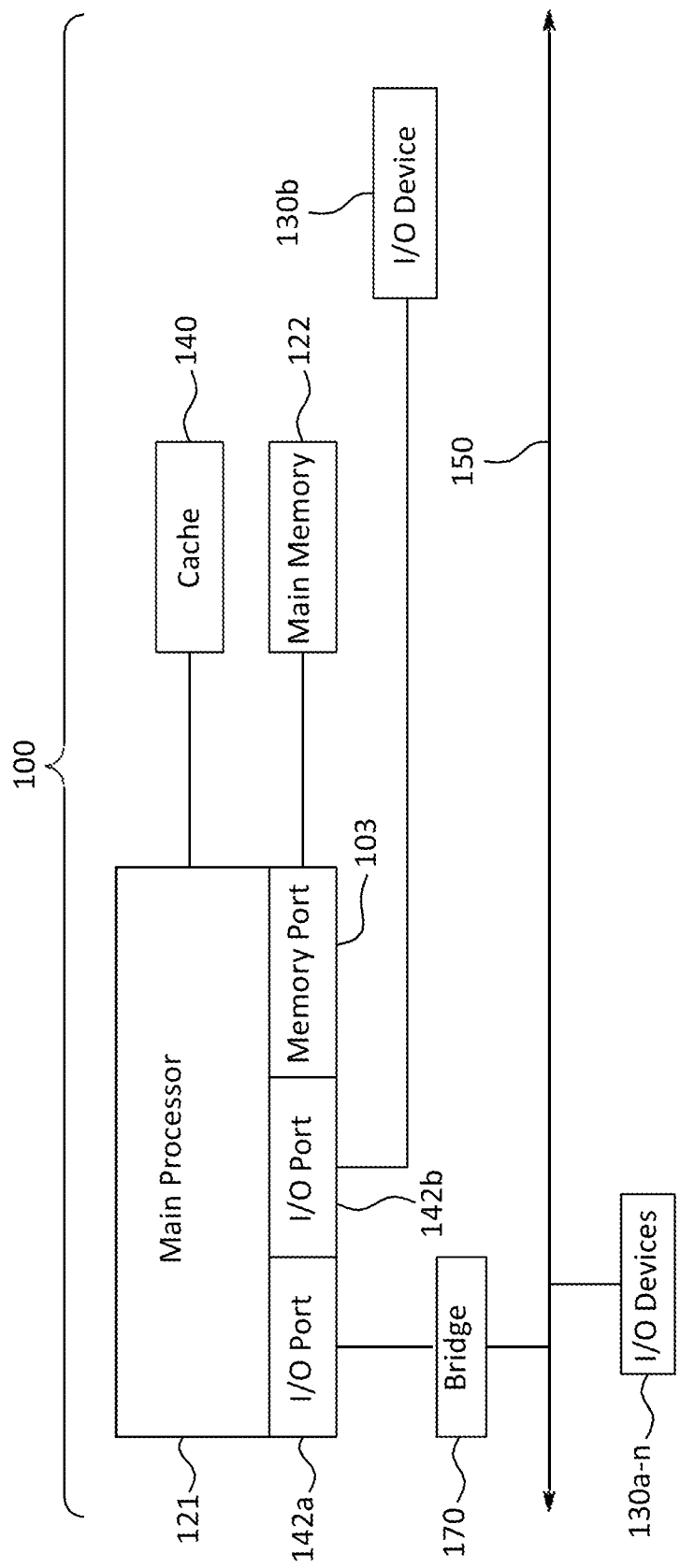

FIGS. 1C and 1D depict block diagrams of a computing device 100 useful for practicing an embodiment of client 102 or server 106. As shown in FIGS. 1C and 1D, each computing device 100 includes central processing unit 121, and main memory unit 122. As shown in FIG. 1C, computing device 100 may include storage device 128, installation device 116, network interface 118, and I/O controller 123, display devices 124a-124n, keyboard 126 and pointing device 127, e.g., a mouse. Storage device 128 may include, without limitation, operating system 129, software 131, and a software of a simulated phishing system 120. As shown in FIG. 1D, each computing device 100 may also include additional optional elements, e.g., a memory port 103, bridge 170, one or more input/output devices 130a-130n (generally referred to using reference numeral 130), and cache memory 140 in communication with central processing unit 121.

Central processing unit 121 is any logic circuitry that responds to and processes instructions fetched from main memory unit 122. In many embodiments, central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. Computing device 100 may be based on any of these processors, or any other processor capable of operating as described herein. Central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTER CORE i5 and INTEL CORE i7.

Main memory unit 122 may include one or more memory chips capable of storing data and allowing any storage location to be directly accessed by microprocessor 121. Main memory unit 122 may be volatile and faster than storage 128 memory. Main memory units 122 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, main memory 122 or storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. Main memory 122 may be based on any of the above described memory chips, or any other available memory chips capable of operating as described herein. In the embodiment shown in FIG. 1C, processor 121 communicates with main memory 122 via system bus 150 (described in more detail below). FIG. 1D depicts an embodiment of computing device 100 in which the processor communicates directly with main memory 122 via memory port 103. For example, in FIG. 1D main memory 122 may be DRDRAM.

FIG. 1D depicts an embodiment in which the main processor 121 communicates directly with cache memory 140 via a secondary bus, sometimes referred to as a backside bus. In other embodiments, main processor 121 communicates with cache memory 140 using system bus 150. Cache memory 140 typically has a faster response time than main memory 122 and is typically provided by SRAM, BSRAM, or EDRAM. In the embodiment shown in FIG. 1D, processor 121 communicates with various I/O devices 130 via local system bus 150. Various buses may be used to connect central processing unit 121 to any of I/O devices 130, including a PCI bus, a PCI-X bus, or a PCI-Express bus, or a NuBus. For embodiments in which the I/O device is video display 124, processor 121 may use an Advanced Graphic Port (AGP) to communicate with display 124 or the I/O controller 123 for display 124. FIG. 1D depicts an embodiment of computer 100 in which main processor 121 communicates directly with I/O device 130b or other processors 121 via HYPERTRANSPORT, RAPIDIO, or INFINIBAND communications technology. FIG. 1D also depicts an embodiment in which local busses and direct communication are mixed: processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple iPhone. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for iPhone by Apple, Google Now or Google Voice Search, and Alexa by Amazon.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by I/O controller 123 as shown in FIG. 1C. The I/O controller may control one or more I/O devices, such as, e.g., keyboard 126 and pointing device 127, e.g., a mouse or optical pen. Furthermore, an I/O device may also provide storage and/or installation medium 116 for the computing device 100. In still other embodiments, computing device 100 may provide USB connections (not shown) to receive handheld USB storage devices. In further embodiments, a I/O device 130 may be a bridge between the system bus 150 and an external communication bus, e.g. a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, computing device 100 may include or connect to multiple display devices 124a-124n, which each may be of the same or different type and/or form. As such, any of I/O devices 130a-130n and/or the I/O controller 123 may include any type and/or form of suitable hardware, software, or combination of hardware and software to support, enable or provide for the connection and use of multiple display devices 124a-124n by the computing device 100. For example, computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, computing device 100 may include multiple video adapters, with each video adapter connected to one or more of display devices 124a-124n. In some embodiments, any portion of the operating system of computing device 100 may be configured for using multiple displays 124a-124n. In other embodiments, one or more of display devices 124a-124n may be provided by one or more other computing devices 100a or 100b connected to computing device 100, via network 104. In some embodiments, software may be designed and constructed to use another computer's display device as second display device 124a for computing device 100. For example, in one embodiment, an Apple iPad may connect to computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, computing device 100 may comprise storage device 128 (e.g. one or more hard disk drives or redundant arrays of independent disks) for storing an operating system or other related software, and for storing application software programs such as any program related to the threat dispositioning system software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to computing device 100 via bus 150. Some storage device 128 may be external and connect to computing device 100 via a I/O device 130 that provides an external bus. Some storage device 128 may connect to computing device 100 via network interface 118 over network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Computing device 100 (e.g., client device 102) may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on client device 102. An application distribution platform may include a repository of applications on server 106 or cloud 108, which clients 102a-102n may access over a network 104. An application distribution platform may include application developed and provided by various developers. A user of client device 102 may select, purchase and/or download an application via the application distribution platform.

Furthermore, computing device 100 may include a network interface 118 to interface to network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. Network interface 118 may comprise a built-in network adapter, network interface card, PCMCIA network card, EXPRESSCARD network card, card bus network adapter, wireless network adapter, USB network adapter, modem or any other device suitable for interfacing computing device 100 to any type of network capable of communication and performing the operations described herein.

Computing device 100 of the sort depicted in FIGS. 1B and 1C may operate under the control of an operating system, which controls scheduling of tasks and access to system resources. Computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Wash.; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

Computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. Computer system 100 has sufficient processor power and memory capacity to perform the operations described herein. In some embodiments, computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, computing device 100 is a gaming system. For example, computer system 100 may comprise a PLAYSTATION 3, or PERSONAL PLAYSTATION PORTABLE (PSP), PLAYSTATION VITA, PLAYSTATION 4, or a PLAYSTATION 4 PRO device manufactured by the Sony Corporation of Tokyo, Japan, or a NINTENDO DS, NINTENDO 3DS, NINTENDO WII, NINTENDO WII U, or a NINTENDO SWITCH device manufactured by Nintendo Co., Ltd., of Kyoto, Japan, or an XBOX 360 device manufactured by Microsoft Corporation.

In some embodiments, computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, computing device 100 is a tablet e.g. the IPAD line of devices by Apple; GALAXY TAB family of devices by Samsung; or KINDLE FIRE, by Amazon.com, Inc. of Seattle, Wash. In other embodiments, computing device 100 is an eBook reader, e.g. the KINDLE family of devices by Amazon.com, or NOOK family of devices by Barnes & Noble, Inc. of New York City, N.Y.

In some embodiments, communications device 102 includes a combination of devices, e.g. a smartphone combined with a digital audio player or portable media player. For example, one of these embodiments is a smartphone, e.g. the iPhone family of smartphones manufactured by Apple, Inc.; a Samsung GALAXY family of smartphones manufactured by Samsung, Inc; or a Motorola DROID family of smartphones. In yet another embodiment, communications device 102 is a laptop or desktop computer equipped with a web browser and a microphone and speaker system, e.g. a telephony headset. In these embodiments, communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Providing Configurable Responses to Threat Identification The following describes systems and methods for providing configurable responses to threat identification. In particular, systems and methods are described for providing configurable content responsive to a user identifying a simulated phishing email as a phishing email. Further, systems and methods are described for providing configurable content responsive to a user identifying a email from a known trusted partner of an organization as a phishing email.

The systems and the methods of the present disclosure provide for generation of Simple Mail Transfer Protocol (SMTP) extension headers comprising specification of content or content itself to be displayed to a user of an organization responsive to the user of the organization identifying an email as a phishing email. The email may be a simulated phishing email, or an email trusted by the organization. Hereon, the term "extension header" or "SMTP extension header" may be substituted with its abbreviated form "X-header" and these terms may be used interchangeably. An extension header (or X-header) is one type of header, and hence where appropriate, may sometimes be referred to more generally simply as a header. Further, it shall be appreciated that an SMTP email may comprise a header section and a message body section. The header section may comprise one or more header fields, each conveying an item of information relating to the email. A number of header fields are standardized, such as "Date", "Sender", "Subject" and so forth. The use of proprietary or non-standardized header fields is also supported through the use of extension header fields beginning with "X-". The header section of an SMTP email may comprise one or more standardized (or normal) header fields and one or more extension header (X-header) fields. These may also be commonly referred to as one or more standardized (or normal) headers, and one or more extension headers (X-headers). Herein, the terms "header field" and "header" are used synonymously and are interchangeable.

The systems and the methods of the present disclosure may also provide for insertion of SMTP extension headers into emails that an organization does not want to be deleted from a user's inbox, or does not want to be quarantined or sent for threat assessment, in response to determining that the email selected and reported by the user as a phishing email via an agent (or plug-in) integrated into an email client. For example, training emails, password reset emails, emails from Human Resource (HR) or other official organization mails can have one or more SMTP extension headers with a predetermined identifier added, that the agent, threat detection platform or Incident Response (IR) team of the organization can recognize and take appropriate steps to prevent deletion from a user's inbox or to prevent the email from being quarantined or forwarded for threat assessment. Thus, legitimate emails may be prevented from being sent to the IR team as the agent can recognize the legitimate emails based on the one or more SMTP extension headers. Further, the agent can prevent such emails from being sent for triage if the email has the one or more SMTP extension headers. In addition, the IR team can discard emails having the new header that are forwarded. Both options reduce the unnecessary load that is otherwise imposed on the triage system due to users reporting emails that are known by the organization to be 'safe'.

In some embodiments, the systems and the methods of the present disclosure provide a simulation server that may inject the one or more SMTP extension headers into the email, which is then downloaded to an email recipient's inbox when the email recipient is online. Inject should be understood to mean adding to, inserting, including within or any other process that leads to the SMTIP extension headers being incorporated into an email. In some examples, the one or more SMTP extension headers may include a predetermined identifier (for example, for identifying the email as a simulated phishing email or an email from a trusted partner of the organization) and specification of content (for example message content to display to a user responsive to the user selecting to the report an email as suspicious). For example, the specification of content may include a pointer to a storage of messages. The storage of messages may be either local or remote to the email client. As a further example, the specification of content may include a pointer to one or more specific messages within a storage of messages. However so achieved, the specification of content may identify a message to be displayed to the user in the event that the user identifies and selects to report (for example via an agent of the user's email client) the email as a potential phishing email. In implementations, when the one or more SMTP extension headers may include the pointer to a storage of messages, the one or more SMTP extension headers may also provide instructions to the email client to retrieve the content while the email recipient is online. In further example embodiments, the specification of content may comprise the actual content itself, such as in the form of text or text strings included within the SMTP extension headers.

In some example embodiments, the systems and the methods of the present disclosure can operate even when the email client is offline. In cases where the email includes the one or more SMTP extension headers comprising the predetermined identifier and the specification of content, the content may be accessed, downloaded, and stored locally by the email client when online, and the email client can then generate and display messages based on the content even when the user is offline. In further examples, the messages may include dynamic fields that can be populated at the time the messages are created. Dynamic fields may specify, for example, that the agent of the email client inserts a user's name, an organization's name, a simulated phishing campaign name, a date, and so forth in order that the message displayed to the user may individually tailored, personalized or customized. Such insertion of dynamic fields may also be performed even when offline. As a result, and irrespective of whether dynamic fields are used, the user does not have to be online for the message content specified by the header to be displayed in response to the user clicking a button provided by PAB plug-in. This is because, the entirety of the message is either included explicitly in the new SMTP extension header, or is otherwise specified within the new SMTP extension header, and hence may be generated or retrieved by the agent of the email client subsequent to receipt of the email. In either case, the message content (or instructions to follow to generate the message content) may be stored locally by the email client or the agent for later use even when offline.

In some embodiments, the systems and the methods allow third-party or trusted partners of the organization to add headers to the emails that they send to the organization's users. The headers may be added to any email that the trusted partner or the organization wants to be considered trusted and not subject to deletion or threat triage via the PAB plug-in. In some embodiments, to prevent misuse by a third party or an attack by a malicious actor having an understanding of usage of headers, the simulation server may perform encryption of a trusted partner identifier and/or other content for inclusion in the X-header. In examples, such encryption may be based on Public Key Infrastructure (PKI), where the trusted partner of the organization is provided with a private key that the IR team or administrator of the organization has the corresponding key pair to. In examples, the header may be encrypted with the private key either when added to the email by the trusted partner or when added to the email by the third-party server. Optionally, a flag may be included in the email header to notify the agent to look for the encrypted header. In examples, an administrator of an organization may request a new key from a simulation server, either for the organization itself or for one or more trusted partners of the organization. A key store may be established (for example as part of the simulation server or as part of another component of the organization's networked infrastructure) and the organization administrator could have the option of issuing and revoking the keys.

Figure 2A:
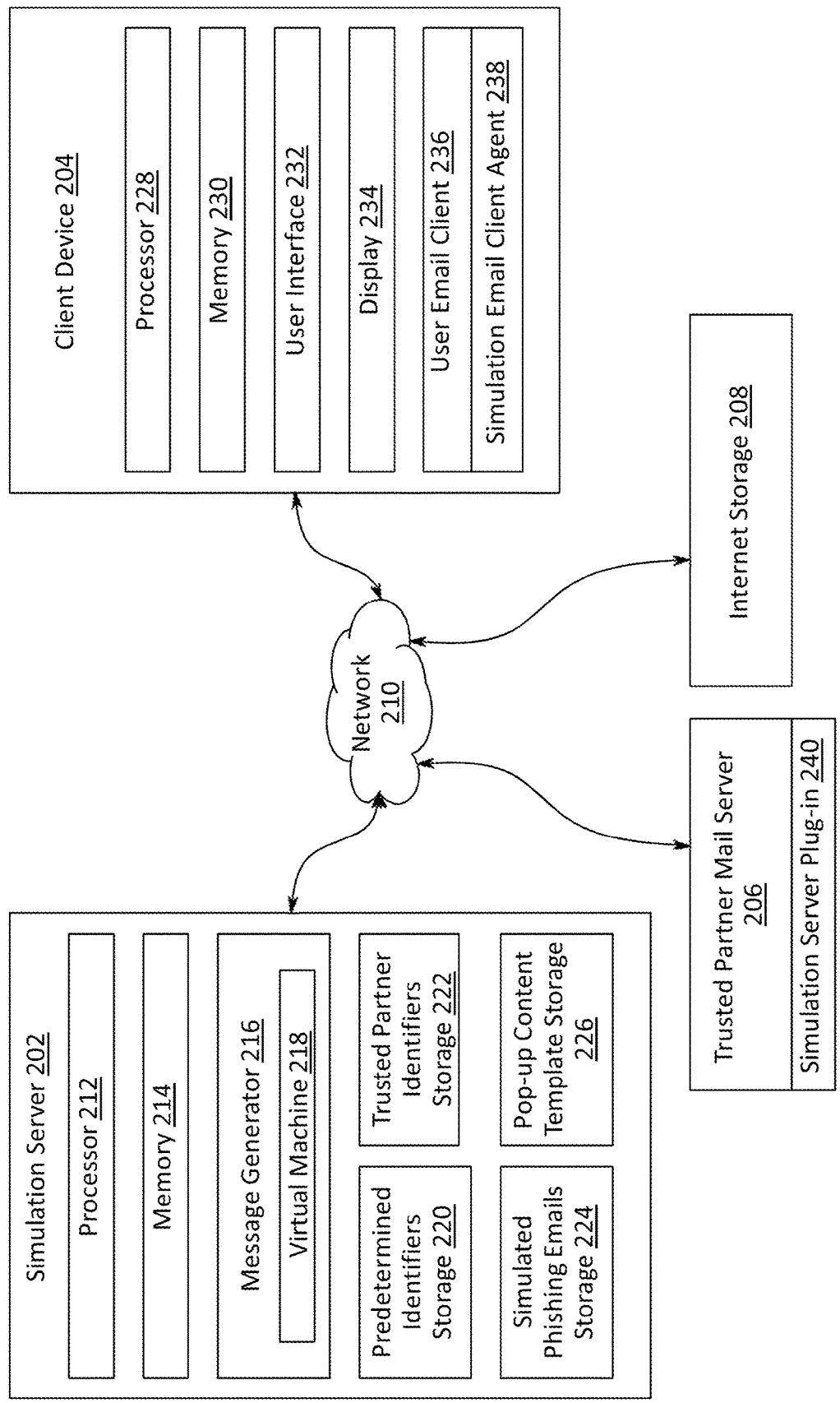
FIG. 2A depicts an implementation of some of the architecture of an implementation of a system for providing configurable responses to threat identification, according to some embodiments.

Referring to FIG. 2A in a general overview, FIG. 2A depicts an implementation of some of the architecture of an implementation of system 200 for providing configurable responses to threat identification, according to some embodiments. System 200 may include simulation server 202, client device 204, trusted partner mail server 206, internet storage 208, and network 210 enabling communication between the system components. Simulation server 202 may handle and deliver email messages over network 210 to client device 204. Network 210 may be an example or instance of network 104, details of which are provided with reference to FIG. 1A and its accompanying description. Simulation server 202 may include processor 212, memory 214, and message generator 216 which may comprise a virtual machine 218. Further, simulation server 202 may comprise predetermined identifiers storage 220, trusted partner identifiers storage 222, simulated phishing emails storage 224, and pop-up content template storage 226.

In some embodiments, client device 204 may include processor 228, memory 230, user interface 232, display 234, user email client 236, and simulation email client agent 238. User email client 236 may be referred to as email client 236 or mail client 236. In one implementation, simulation email client agent 238 may be implemented in user email client 236. In other implementations, simulation email client agent 238 may not be implemented in user email client 236 but may coordinate and communicate with it. In an implementation, trusted partner mail server 206 may comprise simulation server plug-in 240. Further, in an implementation, simulation server 202 and trusted partner mail server 206 may be configured to communicate with client device 204 over network 210.

Referring now to FIG. 2A in more detail, in some embodiments, simulation server 202 may be any server capable of handling and delivering email messages over network 210. Simulation server 202 may be a standalone server or a part of an email server. In an implementation, simulation server 202 may be a server 106 shown in FIG. 1A. Simulation server 202 may be implemented by a device, such as computing device 100 shown in FIGS. 1C and 1D. For example, processor 212 and memory 214 of simulation server 202 may be CPU 121 and main memory 122 respectively as shown in FIGS. 1C and 1D. In implementations, simulation server 202 may be implemented as a part of a cluster of servers. In some embodiments, simulation server 202 may be implemented across a plurality of servers, thereby, tasks performed by simulation server 202 may be performed by the plurality of servers. These tasks may be allocated among the cluster of servers by an application, a service, a daemon, a routine, or other executable logic for task allocation. Simulation server 202 may exchange information with trusted partner mail server 206 and user email client 236 over network 210 using one or more standard email protocols, such as Post Office Protocol 3 (POP3), Internet Message Access Protocol (IMAP), Simple Message Transfer Protocol (SMTP), and Multipurpose Internet Mail Extension (MIME) Protocol. Simulation server 202 may be implemented using, for example, Microsoft® Exchange Server, and HCL Domino. In an example, simulation server 202 may be owned or managed or otherwise associated with an organization or any entity authorized thereof. In an example, simulation server 202 may be a Computer Based Security Awareness Training (CBSAT) server that performs security services such as performing or providing access to simulated phishing attacks as a part of cybersecurity awareness training.

Referring again to FIG. 2A, in some embodiments, message generator 216 may be an application, service, daemon, routine, or other executable logic for generating messages. The messages generated by message generator 216 may be of any appropriate format. For example, they may be email messages, text messages, messages used by messaging applications such as, e.g., WhatsApp™, or any other type of message. The messages may be generated in any appropriate manner, e.g. by running an instance of an application that generates the desired message type, such as running e.g. a Gmail™ application, Microsoft Outlook™, WhatsApp™, a text messaging application, or any other appropriate application. The messages may be generated by running a messaging application on virtual machine 218 or may be run in any other appropriate environment. The messages may be generated to be formatted consistent with specific messaging platforms, for example Outlook 365, Outlook Web Access (OWA), Webmail, iOS, Gmail, and so on. In an implementation, message generator 216 may be configured to generate simulated phishing emails.

Figure 2B:
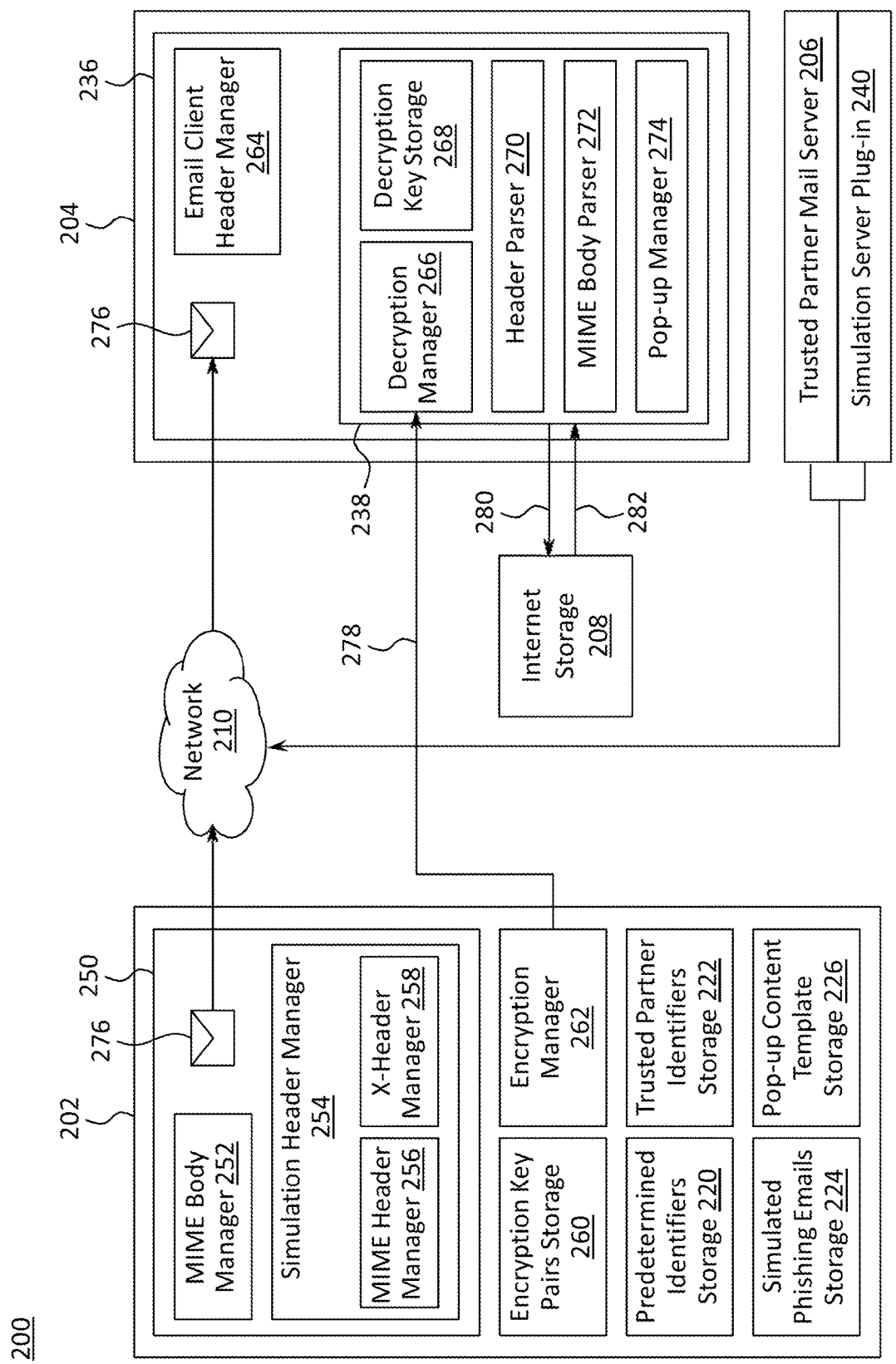
FIG. 2B depicts a detailed view of some of the architecture of the system of FIG. 2A, according to some embodiments.
Figure 2C:
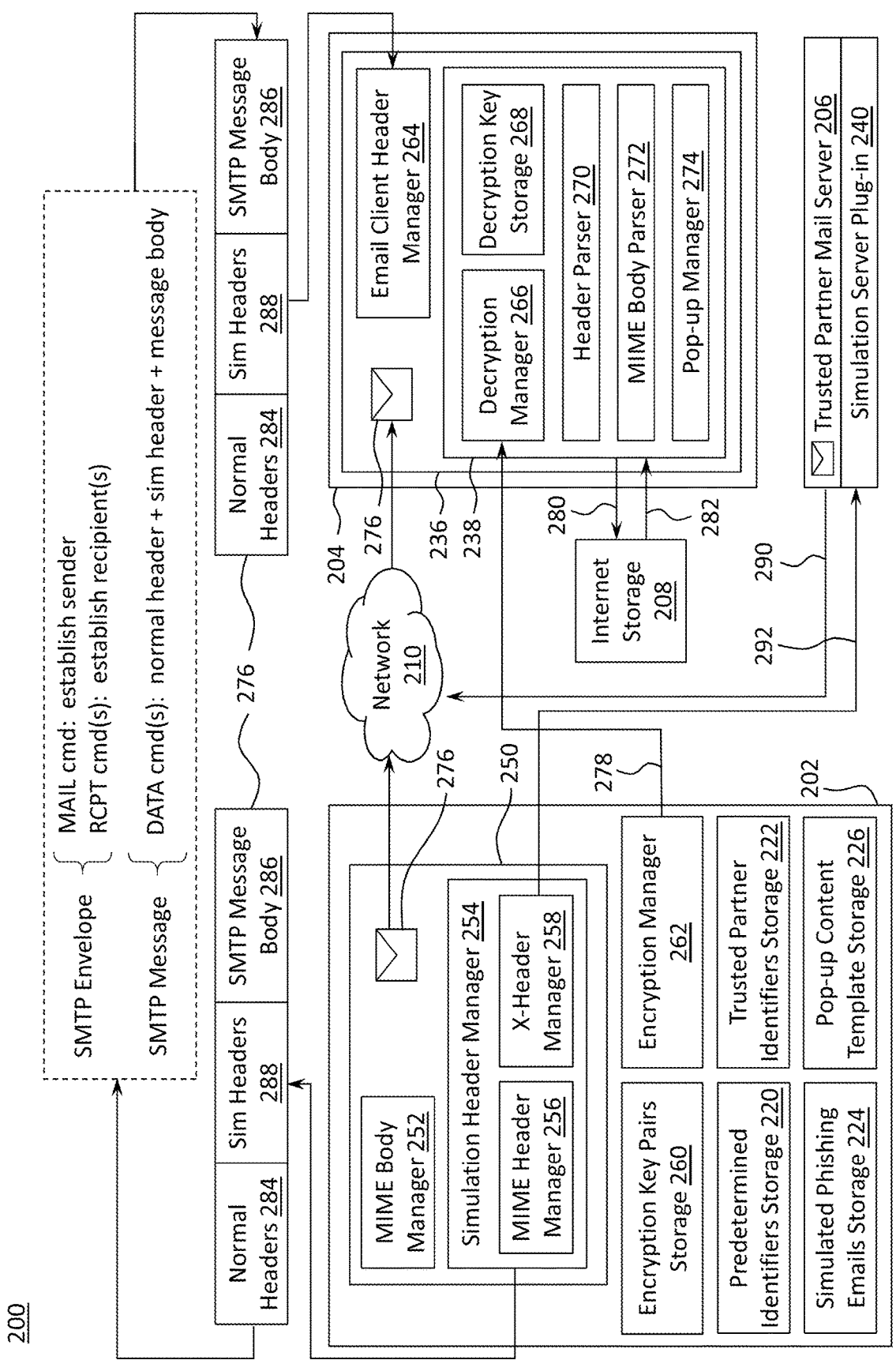
FIG. 2C is an illustration of providing configurable responses to a user that has selected to report an email as a phishing email, according to some embodiments.

In an implementation, predetermined identifiers storage 220 may store message identifiers, for example identifiers for simulated phishing emails such as a recipient identifier, a Campaign Recipient identifier (CRID), and a template identifier. Trusted partner identifiers storage 222 may store identifiers for trusted partners of an organization. Simulated phishing emails storage 224 may store simulated phishing email templates. Pop-up content template storage 226 may store pop-up content templates. Further, the message identifiers stored in predetermined identifiers storage 220, the identifiers for trusted partners stored in trusted partner identifiers storage 222, the simulated phishing email templates stored in simulated phishing emails storage 224, and the pop-up content templates stored in pop-up content template storage 226 may be periodically updated as required. In some embodiments, predetermined identifiers storage 220, simulated phishing emails storage 224, and pop-up content template storage 226 may be accessed by message generator 216 whenever a message, such as a simulated phishing email is to be generated by message generator 216. A pop-up shall be understood to refer to the appearance of graphical or textual content on a display, such as a display 234 of client device 204. In examples, the content may be presented on the display as part of, or bounded within, a "window" or a user interface element or a dialogue box. Whilst other known examples and implementations of pop-ups are contemplated herein, these need not be described in full within this disclosure. Although FIGS. 2A-2C illustrate a storage for pop-up content template, one can appreciate that other content that can be shown in addition to or instead of pop-ups such as hovering content, overlay content and the like are contemplated herein.

In some embodiments, client device 204 may be any device used by a user. For example, the user may be an employee of an organization or any entity. Client device 204 may be any computing device, such as a desktop computer, a laptop, a mobile device, or any other computing device. In an implementation, client device 204 may be a device, such as client device 102 shown in FIGS. 1A and 1B. Client device 204 may be implemented by a device, such as computing device 100 shown in FIGS. 1C and 1D. For example, processor 228 and memory 230 of client device 204 may be CPU 121 and main memory 122 respectively as shown in FIGS. 1C and 1D. Client device 204 may further include user interface 232 such as a keyboard, a mouse, a touch screen, or any other appropriate user interface. It shall be appreciated that such components of client device 204 may correspond to similar components of computing device 100 in FIGS. 1C and 1D, such as keyboard 126, pointing device 127, I/O devices 130a-n and display devices 124a-n. The client device 204 may also include display 234, such as a screen, a monitor connected to the device in any manner, or any other appropriate display. In an implementation, client device 204 may display a received email for user using display 234 and is able to accept user interaction via user interface 232 responsive to the displayed email.

Referring again to FIG. 2A, in some embodiments, user email client 236 may be an application installed on client device 204. In embodiments, user email client 236 may be an application that can be accessed over network 210 through a browser without requiring to be installed on client device 204. In an implementation, user email client 236 may be any application capable of composing, sending, receiving, and reading emails messages. For example, user email client 236 may be an instance of an application, such as Microsoft Outlook™ application, Lotus Notes application, Apple Mail application, Gmail application, or any other known or custom email application. In an implementation, user email client 236 may be configured to receive email messages from simulation server 202 and trusted partner mail server 206. An email message may be interchangeably referred to as an email or a message. In an example, a user of client device 204 may select, purchase and/or download user email client 236, through for example, an application distribution platform. Note that as used herein, the term "application" may refer to one or more applications, services, routines, or other executable logic or instructions.

In some embodiments, trusted partner mail server 206 may be owned and/or controlled and/or managed by a third party, for example, a trusted partner of the organization. Further, trusted partner mail server 206 may be a part of a cluster of servers. In some embodiments, tasks performed by trusted partner mail server 206 may be performed by a plurality of servers. These tasks may be allocated among the cluster of servers by an application, service, daemon, routine, or other executable logic for task allocation.

User email client 236 may include simulation email client agent 238. Simulation email client agent 238 may also be referred to as simulation email client plug-in 238 or mail agent 238 or agent 238. In some implementations, simulation email client agent 238 enables email client users, i.e., recipients of emails, to select to report suspicious emails that they believe may be a threat to them or their organization. An email client plug-in or email client agent may be an application program that may be added to an email client for providing one or more additional features which enables customization. The email client plug-in or email client agent may be provided by the same entity that provides the email client software, or may be provided by a different entity. Based on usage types, email client agents may be classified into different types. Such types may include for example plug-ins providing a User Interface (UI) element such as a button to trigger a function, and plug-ins that highlight portions of email to prompt a user to trigger a function. Functionality of email client agents that use a UI button may be triggered when a user clicks the button while viewing an email. Some of the examples of email client agents that use a button UI include but are not limited to, a Phish Alert Button (PAB) plug-in, a task create plug-in, a spam marking plug-in, an instant message plug-in and a search and highlight plug-in. The other type of email client agents that highlight portions of email may scan the content of the email for specific content. In response to identifying the specific content, the email client agents may highlight the specific content to prompt the user to trigger a function. In response to the user triggering the function, the function is executed to achieve an intended result. Examples of such email client agents include a threat highlighter plug-in, a thesaurus lookup plug-in, a map plug-in, an action item creator plug-in, a meeting creator plug-in and an email alert plug-in. Consider an example of a map plug-in: when an email arrives, the map plug-in may analyze the content of the email to identify an address or location data in the email. The map plug-in communicates to the email client that it uses the location data and highlights the address or location data for the attention of a user. When the user clicks on highlighted information, e.g., the address or location data, that information may be sent to a third-party map application to display the address or location on a map.

Referring back to FIG. 2A, simulation email client agent 238 may be any of the two aforementioned types, or may be of any other type. In one example, simulation email client agent 238 may provide a button plug-in through which function or capabilities of simulation email client agent 238 is triggered by a user action on the button. Upon activation, simulation email client agent 238 may extract information from a body and/or header of an email message for performing its function. In another example, simulation email client agent 238 may provide a highlighting feature which highlights that the email may be a phishing email. The user can click on the highlighted portions which may provide drop-down options (for example, through left or right mouse clicks) that enable the user to select and trigger a particular function or capability of simulation email client agent 238. Other implementations of simulation email client agent 238 not discussed here are contemplated herein.

Referring again to FIG. 2A, in some embodiments, trusted partner mail server 206 may include simulation server plug-in 240. Simulation server 202 may host applications that provide additional and/or custom features to trusted partner mail server 206. In an implementation, simulation server 202 may communicate with simulation server plug-in 240 to provide additional and/or custom features to trusted partner mail server 206. In some implementations, simulation server plug-in 240 may be provided to trusted partner mail server 206 by simulation server 202. In other implementations, simulation server plug-in 240 may be provided to trusted partner mail server 206 by another entity, for example, it may be downloaded from another server. According to one or more embodiments, simulation server 202 may be configured to communicate information, content and/or instructions to simulation server plug-in 240, for example, through emails. Also, simulation server plug-in 240 may be configured to identify information, content and/or instructions from simulation server 202 and perform actions accordingly.

In an implementation, simulation server 202 may communicate with simulation email client agent 238 and simulation server plug-in 240 over network 210. Simulation server 202 may be configured to provide customizable content that simulation email client agent 238 can display to a user when the user correctly identifies a simulated phishing attack. Simulation server plug-in 240 may be configured to inject SMTP X-headers (interchangeably referred to as X-headers) into an email message to be sent out either by the simulation server 202 itself, or by trusted partner mail server 206. In some implementations, simulation server plug-in 240 may send the SMTP X-headers to trusted partner mail server 206 to be included by trusted partner mail server 206 into email messages sent out to users of the organization. In one or more embodiments, simulation server plug-in 240 may generate SMTP X-headers to be included in trusted partner mails. In some embodiments, simulation server plug-in 240 may generate SMTP X-headers even for emails sent by specific groups which are likely to be reported as phishing email despite being genuine email. Simulation email client agent 238 may be configured to identify the SMTP X-headers in the email message and to therefore identify the emails as 'safe'. Further, the simulation email client agent 238 may perform actions in response to interpreting information and directives identified in the SMTP X-headers. In response to a user selecting to report the emails that comprise the X-headers, simulation email client agent 238 may identify the SMTP X-headers in the email message and may determine to refrain from deleting the emails and/or to refrain from sending the emails to the threat management system or IR team.

Referring again to FIG. 2A, system 200 may include internet storage 208. Internet storage 208 may store information that may be accessed by simulation email client agent 238. Internet storage 208 may be used to authenticate messages, retrieve additional content or resources, or give specific instructions to user email client 236, simulation email client agent 238, and/or optionally perform a similar role to that of simulation server plug-in 240. In an example, simulation email client agent 238 may access internet storage 208 to extract any information stored in internet storage 208 for display to a user or recipient of an email message.

Referring to FIG. 2B in a general overview, FIG. 2B depicts a detailed view of some of the architecture of system 200 of FIG. 2A.

In some embodiments, system 200 may include simulation server 202, client device 204, internet storage 208, and network 210 enabling communication between the system components. Further, simulation server 202 may include predetermined identifiers storage 220, trusted partner identifiers storage 222, simulated phishing emails storage 224, and pop-up content template storage 226. In an implementation, simulation server 202 may include simulation mail handler 250. Simulation mail handler 250 may be a program that manages email operations including receiving emails, sending emails, and storing emails. Simulation mail handler 250 may include MIME body manager 252 and simulation header manager 254.

Simulation header manager 254 may further include MIME header manager 256 and X-header manager 258. MIME body manager 252 may be an application or a program that manages emails and structures including injecting content into email bodies of outgoing emails. MIME may refer to an internet standard that enables exchange of different kinds of data files on the Internet and email. MIME supports content such as for example audio, video, images, application programs and application specific data in addition to the ASCII text handled in SMTP. MIME defines techniques for non-text information to be encoded as text under base64 encoding. The MIME standard defines the structure of the MIME body for the email message and MIME-specific fields in the message header. Further, MIME header manager 256 may be an application or a program that manages generation of MIME headers and injection of MIME headers into outgoing emails. Each MIME header may include a label, for example a MIME-Version, and a value, for example 1.0. In an example, a MIME header may be used to select an appropriate "player" application for the type of data the MIME header indicates. Some of these players may be built into the email client, for example, the email client may come with GIF and JPEG image players as well as the ability to handle HTML files while other players may need to be downloaded. Furthermore, X-header manager 258 may be an application or a program that manages the generation of X-headers and the injection of X-headers into outgoing emails. An X-header may be understood as a custom proprietary email header that allow capabilities that are not offered with standard email headers. X-headers are called such because their name must begin with "X-" (to delineate them from standardized header fields). X-headers may be added to emails for various reasons, for example to mark emails as unwanted using an X-header "X-Spam-Status: Yes". In an implementation, X-headers are used for communicating information to simulation email client agent 238.

In some embodiments, simulation server 202 may include encryption key pairs storage 260 and encryption manager 262. Encryption key pairs storage 260 may include a plurality of unique key pairs and may also include a plurality of group key pairs. In an example, encryption key pairs storage 260 may include a unique key pair for each user email client 236 or for each simulation email client agent 238, or for each of the trusted partners of the organization. In a further example, encryption key pairs storage 260 may include a group key pair for each group of user email clients 236, each group of simulation email client agents 238 or each group of trusted partners of the organization. The use of unique key pairs or group key pairs may depend on the circumstance. In an implementation, if simulation server 202 wishes to communicate individual information to a single endpoint (such as an email client 236, a simulation email client agent 238 or a trusted partner mail server 206), it may do so using a unique key pair. In implementations, if simulation server 202 wishes to communicate common information to multiple endpoints, it may do so using a group key pair. For instance, when a user installs simulation email client agent 238, simulation email client agent 238 may receive a key from a unique key pair and may also receive a key from one or more group key pairs. The other key from the unique key pair may be used by simulation server 202 and is referred to herein as a server-side unique key of a key pair. If the simulation server 202 wishes to customize the actions performed on a per-email-client basis, then it may use one of its server-side unique keys to encrypt the content of the X-header. In some examples, simulation email client 238 may try to decrypt the content of a received X-header using all the keys that it has, and if it is able to generate plain text or other decodable content with one of its keys, then it may act on the plain text or other decodable content thereby retrieved from the decrypted X-header. If it cannot, then the email does not contain an action for that specific email client. In additional examples, simulation server 202 may wish to send actions to multiple email clients, and may accomplish this by encrypting the message using a group key (herein referred to as a server-side group key) from one of its group key pairs. For instance, if simulation server 202 requires a number of email clients to download and run a software upgrade or a patch to the simulation email client agent 238 (or plug-in), then simulation server 202 can encrypt the content of the X-header with a server-side group key from a group key pair. Then any email clients that have the corresponding key of the group key pair will be able to decrypt the content of the X-header and execute it (for example causing the user email client 236 or simulation email client agent 238 to initiate and complete the software update procedure). Encryption manager 262 may be an application or a program that manages encryption operations.

Client device 204 may include user email client 236. User email client 236 may include email client header manager 264 and simulation email client agent 238. Email client header manager 264 may be an application or a program that manages headers of emails and their structures including identifying and removing predetermined identifiers and/or pop-up content from email headers. Further, simulation email client agent 238 may include decryption manager 266, decryption key storage 268, header parser 270, MIME body parser 272, and pop-up manager 274. Decryption manager 266 may be an application or a program that manages decryption operations. Further, decryption key storage 268 may store decryption keys shared by simulation server 202. Header parser 270 may parse email headers for pop-up content and/or content comprising directives. MIME body parser 272 may parse email bodies for pop-up content and/or content comprising directives. Pop-up manager 274 may perform actions based on pop-up content and/or directives identified by header parser 270 and/or MIME body parser 272.

In operation, as a part of cybersecurity awareness training, simulation server 202 may be configured to generate simulated phishing email 276 to be sent out to a user or an employee of an organization. In an implementation, simulation server 202 may access simulated phishing emails storage 224 and retrieve a simulated phishing email template for generating simulated phishing email 276. In an example, simulated phishing email 276 may appear to be delivered from a trusted email address, such as the email address of an executive of the organization at which the user is employed. In another example, simulated phishing email 276 may include a "Subject:" field that is intended to cause the user to take an action, such as resetting of a password due to suspicious activity. In some embodiments, simulation server 202 may generate multiple instances of simulated phishing email 276 which may be delivered to a plurality of users of the organization. In an example, simulation server 202 may generate simulated phishing emails such that the "From:" and "Subject:" fields of each simulated phishing email are identical, while the "To:" field is adjusted according to the plurality of users or recipients.

In some implementations, upon generating simulated phishing email 276, simulation server 202 may generate one or more Simple Mail Transfer Protocol (SMTP) extension headers. In one embodiment, simulation server 202 may create two SMTP extension headers, namely a first SMTP extension header and a second SMTP extension header. The first SMTP extension header may include a pre-determined identifier that identifies simulated phishing email 276 as a known simulated phishing email generated by simulation server 202. Further, the second SMTP extension header may include the specification of content for display to the user responsive to the user identifying simulated phishing email 276 as a phishing email. In some examples, the specification of content in the second SMTP extension header may include a pointer to a message or to a storage of messages. In other examples, the second SMTP extension header may include the content itself. Simulation server 202 may access pop-up content template storage 226 and retrieve a pop-up content template for creating the content. In an implementation, the specification of content may be used by simulation email client agent 238 (or by a component therein, such as pop-up manager 274) for generating messages to be displayed in response to the user selecting to report an email as a phishing email. In an example, the message that is displayed to the user may reinforce training related to the particular exploit attempted by simulated phishing email 276 or may perform any other function related to cybersecurity awareness training. In an implementation, simulation server 202 may retrieve the predetermined identifier for simulated phishing email 276 from predetermined identifiers storage 220.

In some implementations, the specification of content to be displayed may include textual or other content that is directly embedded within the extension header itself. In other implementations, the specification of content may include a pointer to a location from where the content to be displayed may be accessed and/or downloaded. For example, the specification of content may include a Uniform Resource Locator (URL) and/or a pointer to a data storage comprising messages. In an implementation, the specification of content may include a pointer that may lead to internet storage 208. Further, the specification of content may include a pointer to a table of customizable text fields cached in simulation email client agent 238 or stored in simulation server 202 to populate into the message. In an implementation, the header may include a pointer to a table of customizable text fields that is stored online in locations such as internet storage 208. In an implementation, the specification of content may identify content based on one of a type or a category of phishing attack. For example, the specification of content may indicate a type of exploit or test that was used. The specification of content may identify content on a level of one of a user, a template, a campaign or an organization. The user level content may indicate content designed for targeting an individual user. In one example, the content may be generated to reinforce training for a user whose security awareness score (or 'risk' score) is poor or who may not be properly identifying phishing mails. Further, campaign level content may refer to content associated with a simulated phishing attack campaign. The simulated phishing attack campaign may, for example, target a group of users, such as employees of a business unit of the organization for imparting cybersecurity awareness. The campaign may be carried out for specific purposes including giving enhanced training to more vulnerable groups in the organization. The campaign may be performed by simulation server 202. In another example, the campaign may refer to multiple different phishing attack campaigns of different types. Such multiple different phishing attack campaigns may be targeted against different or the same users using different attacks and exploits. The template may refer to a reusable layout for a simulated phishing training. The template may comprise any type and form of data structure, configuration and/or parameters, set of data, policies and/or rules for specifying how to create, execute and/or manage a campaign. In an example, the template used by simulation server 202 may be provided by a third party. The template may be used during the campaign as well. Organization level content may indicate content designed for all the users in the organization.

In some implementations, the specification of content may comprise dynamic fields to be determined and populated by simulation email client agent 238. For example, the dynamic fields may be determined and populated at the time the messages are received by simulation email client agent 238. Dynamic fields may be used, for example, to add a name of a user/recipient to whom the message is intended for or to add the name of the organization of the user. Dynamic fields may also be used to display risk scores of users. A risk score of a user may be a representation of vulnerability of a user to a malicious attack. In an example, information for the dynamic fields may be extracted from other parts of the SMTP extension headers. For example, a simple 'username' dynamic field may be included in the SMTP extension header of a simulated phishing email that is sent to a plurality of users or groups. Simulation email client agent 238 may identify the dynamic field and populate message content with an actual username in its place. This permits simulation server 202 to use a common definition of the content (across multiple recipients) and yet still have the message shown to each user in a personalized fashion.

In an implementation, in addition to the predetermined identifier and the specification of content, the SMTP extension headers may also include instructions for simulation email client agent 238 as to where to find the predetermined identifier and the specification of content in simulated phishing email 276. In implementations, the instructions as to where to find the predetermined identifier and the specification of content in simulated phishing email 276 may be communicated to simulation email client agent 238 at the time of installation of simulation email client agent 238 in user email client 236. In an example, a flag may be inserted in the SMTP extension headers to notify simulation email client agent 238 to look for the predetermined identifier and the specification of content.

Subsequent to generation of the SMTP extension headers, simulation server 202 may encrypt the predetermined identifier and the specification of content using one key, also referred to as an encryption key, of a unique key pair. In an example, simulation server 202 may retrieve the unique key pair from encryption key pairs storage 260. Further, simulation server 202 may send the other key, also referred to as a decryption key 278, of the unique key-pair to simulation email client agent 238. On receiving the decryption key 278, simulation email client agent 238 may store the decryption key in decryption key storage 268 for future use.

In an embodiment, simulation server 202 may inject the SMTP extension headers comprising the predetermined identifier and the specification of content in simulated phishing email 276. In one example implementation, the SMTP extension headers may be injected into simulated phishing email 276 in a way that the predetermined identifier and the specification of content is not visible to the user or recipient of simulated phishing email 276. In another embodiment, the SMTP extension headers are injected such that simulation email client agent 238 may extract the predetermined identifier and the specification of content from simulated phishing email 276. In an implementation, simulation header manager 254 may facilitate the injection of the predetermined identifier and the specification of content in simulated phishing email 276.

In an implementation, simulation server 202 may communicate simulated phishing email 276 comprising the SMTP extension headers to email accounts of the plurality of users of the organization. In an example, simulation server 202 may communicate simulated phishing email 276 to the plurality of users via SMTP protocol.

Referring again to FIG. 2B, in some implementations, a user of user email client 236 may receive simulated phishing email 276 in his or her mail inbox. In an implementation, simulation email client agent 238 may provide a User Interface (UI) element such as a button in user email client 236. In an example, when the user receives simulated phishing email 276 and the user suspects that simulated phishing email 276 is a phishing email, then the user may click on the UI element using, for example, a mouse pointer to select to report simulated phishing email 276. For example, simulated phishing email 276 may include the subject 'Statement of account' and may include a Microsoft Excel file as an attachment. A user who is used to receiving emails with statements in the email body may find simulated phishing email 276 suspicious due to the presence of the excel file attachment. Similarly, other users who may be trained to spot phishing emails may identify simulated phishing email 276 to be a phishing attack. Any user suspecting simulated phishing email 276 to be a phishing email, may select to report simulated phishing email 276 by clicking on the UI element.

In an implementation, when the user selects to report, via the UI element, simulated phishing email 276 to be a phishing attack, simulation email client agent 238 may receive an indication that the user has selected to report simulated phishing email 276 received at the user's email account as a phishing email. In response, simulation email client agent 238 may determine if simulated phishing email 276 (that the user has selected to report) is a known simulated phishing email generated by simulation server 202 based on the presence of the predetermined identifier in the SMTP extension headers.

In an implementation, for the purposes of determining if simulated phishing email 276 (that the user has selected to report) is a known simulated phishing email, simulation email client agent 238 may extract the SMTP extension headers from simulated phishing email 276. In an implementation, email client header manager 264 may facilitate the extraction of the SMTP extension headers from simulated phishing email 276. Upon extraction of the SMTP extension headers, simulation email client agent 238 may decrypt SMTP extension headers using the decryption key 278 shared by simulation server 202. In an example, simulation email client agent 238 may retrieve the decryption key 278 from decryption key storage 268. In an implementation, decryption manager 266 may facilitate the decryption of the SMTP extension headers.

Subsequently, header parser 270 of simulation email client agent 238 may parse the SMTP extension headers to identify the predetermined identifier and the specification of content within the decrypted SMTP extension headers. In an implementation, the presence of the predetermined identifier in the SMTP extension headers may be used by simulation email client agent 238 to determine that the reported simulated phishing email 276 is a known simulated phishing email generated by simulation server 202 and is not an actual phishing email.

In an implementation, header parser 270 may send the specification of content to pop-up manager 274 for acting on the specification of content. In an implementation, pop-up manager 274 may generate a message based on the specification of content to be displayed to the user when correctly identifying simulated phishing email 276 as a phishing email. In an example, the specification of content may include the content itself, or may include a pointer to a location from where pop-up manager 274 may retrieve the content for generating the message. In an example, the specification of content may include a Uniform Resource Locator (URL) and/or a pointer to a storage of messages comprising content.

In an example, the specification of content may include a pointer to internet storage 208 for downloading the content to generate the message. In instances when the specification of content includes a pointer to internet storage 208, pop-up manager 274 may access 280 internet storage 208 for identifying the content. Upon identifying the content, pop-up manager 274 may retrieve/download 282 the content from internet storage 208 for generating the message. In further examples, the specification of content may include dynamic fields that are populated by pop-up manager 274 when generating message content to display. Pop-up manager 274 may send the generated message to display 234 of client device 204 for presentation to the user. In an example, the message may inform the user that the user has correctly identified the simulated phishing attack. The message may also indicate the type of exploit that the user recognized, in order to reinforce training to the user. Accordingly, when the user clicks on the UI element to select to report simulated phishing email 276 as a phishing attack, a pop-up comprising the generated message may be displayed to the user.

Referring to FIG. 2C in a general overview, FIG. 2C is an illustration of providing configurable responses to a user that has selected to report an email as a phishing email. More specifically, FIG. 2C illustrates providing configurable responses to a user in the case that the user has selected to report a simulated phishing email as a phishing email, and/or in the case that a user has selected to report a message from a known trusted partner of an organization as a phishing email.

As a part of cybersecurity awareness training, simulation server 202 may be configured to generate simulated phishing email 276 to be sent out to a user of an organization. In an implementation, simulation server 202 may access simulated phishing emails storage 224 and retrieve a simulated phishing email template for generating simulated phishing email 276. Simulated phishing email 276 may be interchangeably referred to as email 276 hereinafter. In an example, email 276 may be an SMTP message. Email 276 may include normal headers 284 (also referred to as standard headers) and SMTP message body 286. Additionally, simulation server 202 may create one or more extended SMTP headers (which may be referred to hereon as sim headers 288) that may comprise a predetermined identifier that identifies email 276 as a known simulated phishing email generated by simulation server 202. Sim headers 288 may further comprise specification of content to be displayed to the user responsive to the user identifying email 276 as a phishing email. In an implementation, simulation server 202 may retrieve the predetermined identifier from predetermined identifiers storage 220. Further, in an example, the specification of content may include content that is explicitly included within the sim headers 288 and which may be retrieved by simulation server 202 from pop-up content template storage 226. In examples, the specification of content may include dynamic fields to be determined and populated by simulation email client plug-in 238. In another example, the specification of content may include a pointer to a storage of messages comprising content. In yet another example, the specification of content may identify the content based on one of a type or a category of phishing attack. In yet another example, the specification of content may identify the content based on a level of one of the user, a template, a campaign, or the organization.

In an implementation, where sim headers 288 include a pointer to a storage of messages, sim headers 288 may also provide instructions to user email client 236 to retrieve content while the user or recipient of email 276 is online. Since, email 276 has already been downloaded with sim headers 288 comprising the predetermined identifier and the content, user email client 236 may retrieve and store any additional content (if necessary) whilst online in order to later generate and display messages even when the user is offline. The messages may include dynamic fields that may be populated at the time the messages are created. As a result, the user does not have to be online for the header text to be displayed in response to the user selecting to report email 276.

In an implementation, simulation server 202 may encrypt sim headers 288 using one key, also referred to as an encryption key, of a unique key pair. In an example, simulation server 202 may retrieve the unique key pair from encryption key pairs storage 260. Simulation server 202 may encrypt sim headers 288 to prevent any unauthorized access to sim headers 288. In an example, simulation server 202 may encrypt the entirety of sim headers 288. In another example, simulation server 202 may encrypt only that content within sim headers 288 which is intended for simulation email client plug-in 238. Further, simulation server 202 may send the other key, also referred to as decryption key 278, of the unique key-pair to simulation email client agent 238. On receiving decryption key 278, simulation email client agent 238 may store decryption key 278 in decryption key storage 268 for future use. In an implementation, encryption manager 262 may facilitate the encryption of sim headers 288. Thereafter, simulation server 202 may inject encrypted sim headers 288 into email 276.

In an implementation, the process of the injection of sim headers 288 into email 276 may be managed by MIME header manager 256 and/or by X-header manager 258. Once encrypted sim headers 288 are injected into email 276, simulation server 202 may transmit email 276 comprising normal headers 284, SMTP message body 286, and encrypted sim headers 288 to user email client 236. In an example, simulation server 202 may transmit email 276 via the SMTP protocol. In performing the transmission of a message, the SMTP protocol defines an SMTP envelope portion in which MAIL and RCPT commands are communicated between an email server and an email client in order to establish the sender of the email and one or more recipients of the email. Following the envelope portion, the SMTP protocol defines an SMTP message portion in which a DATA command is sent from the email server to the one or more email clients. The DATA command comprises email 276 in the form of one or more email message headers (which may also be referred to as one or more header fields) such as normal headers 284 and sim headers 288, and SMTP message body 286. In an implementation, simulation server 202 may send email 276 to email accounts of a plurality of users of the organization. Referring again to FIG. 2C, in some implementations, a user of user email client 236 may receive email 276 in his or her mail inbox. The user may also be referred to as a recipient of the email or email recipient. In an implementation, simulation email client agent 238 may provide a UI element such as a button in user email client 236. In an example, when the user receives email 276 and suspects that email 276 is a phishing email, then the user may click on the UI element using, for example, a mouse pointer to report email 276. For example, email 276 may include subject 'Statement of account' and may include a Microsoft Excel file as an attachment. A user who is used to receiving email with statements in the email body may find email 276 suspicious due to the presence of the excel file attachment. Similarly, other users who may be trained to spot phishing emails may identify email 276 to be a phishing attack. Any user suspecting email 276 to be a phishing email, may select to report the email 276 by clicking on the UI element.

In an implementation, when the user selects to report, via the UI element, email 276 to be a phishing attack, simulation email client agent 238 may receive an indication that the user has selected to report email 276 received at the user's email account as a phishing email. Thereafter, simulation email client agent 238 may determine if email 276 reported by the user is a known simulated phishing email generated by simulation server 202 based on the presence of the predetermined identifier in sim headers 288.

In an implementation, for the purposes of determining if email 276 reported by the user is a known simulated phishing email, simulation email client agent 238 may extract sim headers 288 from email 276. In an implementation, email client header manager 264 may facilitate the extraction of sim headers 288 from email 276. Upon extraction of sim headers 288, simulation email client agent 238 may decrypt sim headers 288 using decryption key 278 shared by simulation server 202. In an example, simulation email client agent 238 may retrieve decryption key 278 from decryption key storage 268. In an implementation, decryption manager 266 may facilitate the decryption of sim headers 288.

Subsequently, header parser 270 of simulation email client agent 238 may identify the predetermined identifier and the specification of content within the decrypted sim headers 288. In an implementation, the presence of the predetermined identifier in sim headers 288 may be used by simulation email client agent 238 to determine that the reported email 276 is a known simulated phishing email generated by simulation server 202 and not an actual phishing email.

Thereafter, simulation email client agent 238 may delete email 276 and/or may refrain from forwarding email 276 to the threat management email system or IR team. In an example, simulation email client agent 238 may remove email 276 from the user's inbox and put it in a deleted items folder, such that the user no longer has access to email 276. Further, simulation email client agent 238 may communicate to simulation server 202 that the user selected to report email 276 as a phishing email and/or email 276 was correctly identified by the user.

In an implementation, header parser 270 may send the specification of content to pop-up manager 274 for acting on the specification of content. In an implementation, pop-up manager 274 may generate a message based on the specification of content to be displayed to the user for correctly identifying email 276 as a phishing email. In some implementations, the specification of content to be displayed may include textual or other content that is directly embedded within the header itself. In other examples, the specification of content may include a pointer to a location from where pop-up manager 274 may retrieve the content for generating the message. In an example, the specification of content may include a Uniform Resource Locator (URL) and/or a pointer to a storage of messages comprising content.

In an example, the specification of content may include a pointer to internet storage 208 for downloading the content to generate the message. In instances when the specification of content includes a pointer to internet storage 208, pop-up manager 274 may access 280 internet storage 208 for identifying the content. Upon identifying the content, pop-up manager 274 may retrieve/download 282 the content from internet storage 208 for generating the message. In further examples, the specification of content may include dynamic fields that are populated by pop-up manager 274 when generating message content to display. Pop-up manager 274 may send the generated message to display 234 of client device 204 for presentation to the user. In an example, the message may be displayed as a pop-up message on display 234. In another example, the user may receive the message in his or her mail inbox. Further, in an example, the message may inform the user that the user has correctly identified the simulated phishing attack.

Referring again to FIG. 2C, FIG. 2C further describes for providing configurable responses to a user in the case that the user has selected to report a message from a known trusted partner of an organization as a phishing email. In an implementation, whenever a trusted partner of an organization wishes to send out an email 290 to users of the organization, simulation server 202 may generate one or more X-headers 292 comprising a predetermined identifier (that identifies email 290 as being from the trusted partner of the organization) and content to be displayed to a user responsive to the user identifying email 290 as a phishing email. In an example, X-headers 292 may be generated for the trusted partner to enable the trusted partner to inject these into emails sent from their own mail server, for example mails that are sent by trusted partner mail server 206. In another example, X-headers 292 may be generated for the organization to inject into emails that are sent by their own mail server. In an implementation, simulation server 202 may retrieve the predetermined identifier from trusted partner identifiers storage 222. Although, it has been described that simulation server 202 generates X-headers 292 to store the predetermined identifier and the content, in embodiments, simulation server 202 may generate MIME headers or information in an unspecified MIME-type to store the predetermined identifier and the content.

In an implementation, simulation server 202 may encrypt the predetermined identifier using one key of a unique key pair for the trusted partner. In an example, simulation server 202 may retrieve the unique key pair for the trusted partner from encryption key pairs storage 260. Simulation server 202 may encrypt the predetermined identifier to prevent any unauthorized access to the predetermined identifier. Further, simulation server 202 may send other key of the unique key-pair to simulation email client agent 238. On receiving the other key, simulation email client agent 238 may store the other key in decryption key storage 268 for future use. In an implementation, encryption manager 262 may facilitate the encryption of the predetermined identifier. In an example, an administrator at an organization may request a new key from simulation server 202, either for the organization or for the trusted partner of the organization. In some embodiments, the administrator of the organization may be a key administrator administering simulation server 202 managing encryption/authentication of messages. A key store, such as encryption key pairs storage 260 may be established (for example as part of the simulation server 202 or as part of another component of the organization's networked infrastructure) and the organization administrator could have the option of issuing and revoking the keys.

Thereafter, simulation server 202 may send X-headers 292 comprising the encrypted predetermined identifier and the content to trusted partner mail server 206. In an implementation, on receiving X-headers 292, trusted partner mail server 206 may inject X-headers 292 into email 290. In an example, trusted partner mail server 206 may inject X-headers 292 in email 290 via an Application Programming Interface (API) and/or via other known header injection techniques. Although it has been described that simulation server 202 encrypts the predetermined identifier and the content, in implementations, trusted partner mail server 206 may encrypt the predetermined identifier and the content using a key of a key pair shared by simulation server 202 while adding the predetermined identifier and the content into email 290.

Once X-headers 292 are injected into email 290, trusted partner mail server 206 may transmit email 290 comprising X-headers 292 to user email client 236. In an example, trusted partner mail server 206 may transmit email 290 via the SMTP protocol. In an implementation, simulation server 202 may send X-headers 292 to trusted partner mail server 206 such that the trusted partner may include X-headers 292 in all emails that it sends out to users of the organization that it is a trusted partner of In an example, the purpose of including the predetermined identifier for the trusted partner may be to inform simulation email client agent 238 whether email 290 is from a trusted partner of the organization or from the organization itself. Also, the predetermined identifier may inform simulation email client agent 238 as to which trusted partner email 290 or which group in the organization is the email from. Further, the purpose of the specified content may be to inform simulation email client agent 238 whether email 290 is from a trusted partner of the organization or not, and also to instruct simulation email client agent 238 what content to display to the user to inform the user that email 290 is from a trusted partner and that they should go ahead and act upon email 290. In an example, if the user considers email 290 from trusted partner mail server 206 to be a threat and clicks on the UI element, simulation email client agent 238 will be able to recognize X-headers 292 created by simulation server 202 and may refrain from forwarding email 290 to a threat management platform and/or may refrain from deleting email 290 from the user's inbox.

Referring again to FIG. 2C, in some implementations, a user of user email client 236 may receive email 290 in his or her mail inbox. For example, email 290 may include a message "The pension benefits plan period ends this Friday—select your benefits now by clicking on this link!". The user, recognizing the urgency in tone and the prompt of the sender to click on a link (e.g. leading to an external third-party website) may suspect a phishing attack. In response, the user may click on the UI element provided by simulation email client agent 238 using, for example, a mouse pointer to select to report email 290.

In an implementation, when the user selects to report email 290 to be a phishing attack via the UI element, simulation email client agent 238 may receive an indication that the user has selected to report email 290 received at user's email account as a phishing email. Thereafter, simulation email client agent 238 may determine if email 290 reported by the user is a trusted email from the organization's trusted partner based on the presence of the predetermined identifier in X-headers 292.

In an implementation, for the purposes of determining if email 290 reported by the user is a trusted email from the organization's trusted partner, simulation email client agent 238 may extract X-headers 292 from email 290. In an implementation, email client header manager 264 may facilitate the extraction of X-headers 292 from email 290. Upon extraction of X-headers 292, simulation email client agent 238 may decrypt X-headers 292 using the key shared by simulation server 202. In an example, simulation email client agent 238 may retrieve the key from decryption key storage 268. In an implementation, decryption manager 266 may facilitate the decryption of X-headers 292.

Subsequently, header parser 270 of simulation email client agent 238 may identify the predetermined identifier and the specification of content within decrypted X-headers 292. In an implementation, the presence of the predetermined identifier in X-headers 292 may be used by simulation email client agent 238 to determine that the reported email 290 is an email from the trusted partner of the organization and is not a phishing email. Thereafter, simulation email client agent 238 may refrain from deleting email 290 and/or may refrain from forwarding email 290 to the threat management system or IR team.

In an implementation, header parser 270 may send the specification of content to pop-up manager 274 for acting on the specification of content. In an implementation, pop-up manager 274 may generate a message based on the specification of content to be displayed to the user to inform the user that email 290 is an email from the trusted partner of the organization and not a phishing email. In some implementations, the specification of content to be displayed may include textual or other content that is directly embedded within the header itself. In other examples, the specification of content may include a pointer to a location from where pop-up manager 274 may retrieve the content for generating the message. In an example, specification of content may include a Uniform Resource Locator (URL) and/or a pointer to a storage of messages comprising content.

In an example, the specification of content may include a pointer to internet storage 208 for downloading the content to generate the message. In instances when the specification of content includes a pointer to internet storage 208, pop-up manager 274 may access 280 internet storage 208 for identifying the content. Upon identifying the content, pop-up manager 274 may retrieve/download 282 the content from internet storage 208 for generating the message. In further examples, the specification of content may include dynamic fields that are populated by pop-up manager 274 when generating message content to display. Pop-up manager 274 may send the generated message to display 234 of client device 204 for presentation to the user. In an example, the message may inform the user that email 290 is genuinely from the trusted partner of the organization and is not a threat, and that the user should act on email 290 as he or she would for any trusted email. Further, simulation email client agent 238 may enable the user to take action on the reported email 290 without notifying simulation server 202 of reported email 290. Thus, simulation email client agent 238 may provide configurable responses to the user responsive to the user selecting to report suspect emails.

Although FIG. 2C is described with reference to email 290 sent out by a trusted partner of an organization to a user of the organization, the description of FIG. 2C is applicable to any emails that the organization does not want to be deleted or forwarded to threat management systems or IR teams in response to a user selecting to report such emails as phishing emails. In an example, these emails may be sent out by the organization itself. Examples of such emails include, but are not limited to, training emails, password reset emails, emails from HR or other official organizational mails.

Figure 3A:
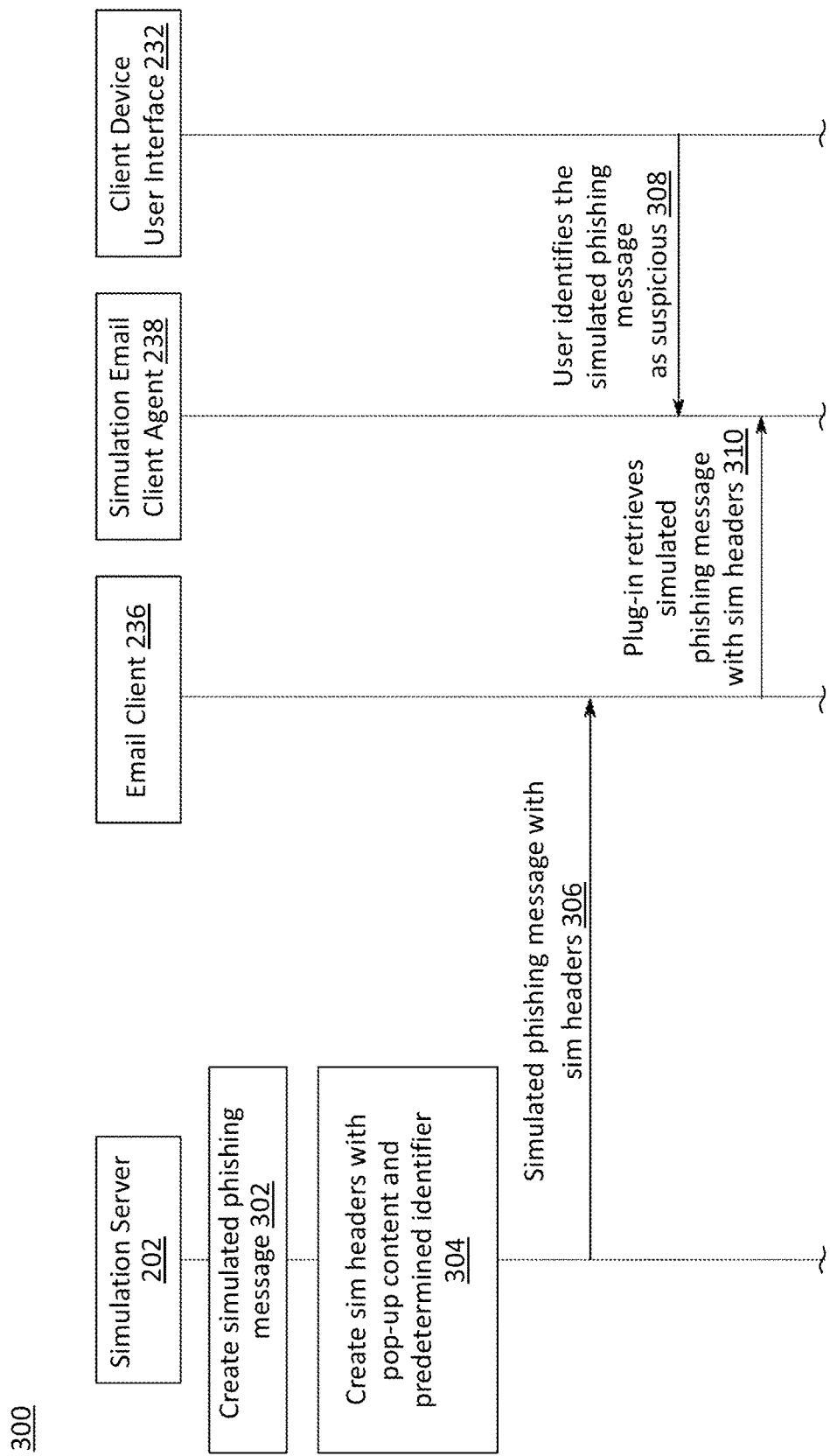
FIGS. 3A and 3B depict a flow chart for providing configurable responses to a user that has selected to report a simulated phishing email as a phishing email, according to some embodiments.
Figure 3B:
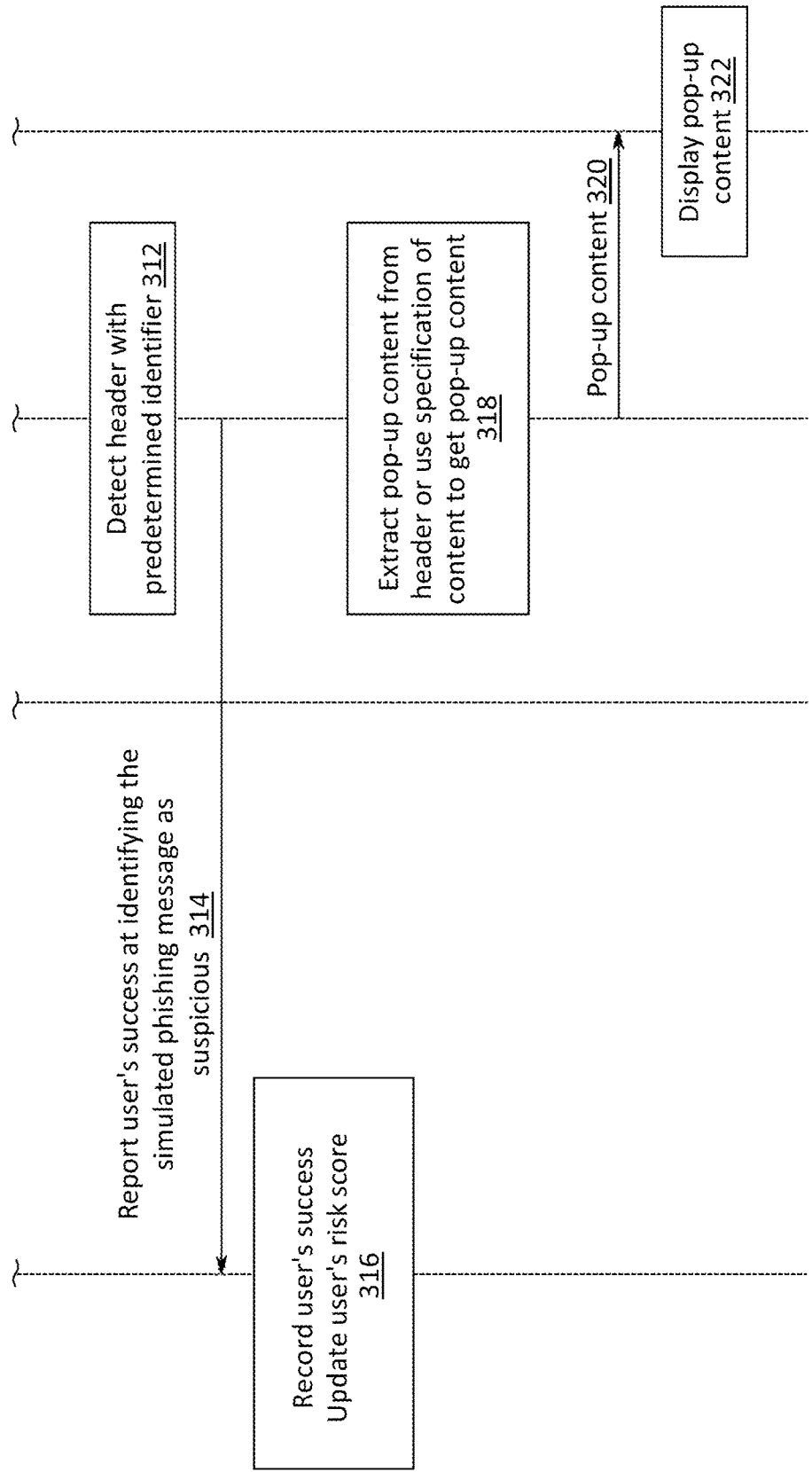

FIGS. 3A and 3B depict a flow chart 300 for providing configurable responses to a user that has selected to report a simulated phishing email as a phishing email, according to some embodiments.

At step 302, in some implementations, simulation server 202 may create a simulated phishing message. The simulated phishing message may also be referred to as a simulated phishing email. In an example, the simulated phishing message may appear to be delivered from a trusted email address, such as the email address of an executive of an organization at which a target recipient or user is employed. In another example, the simulated phishing message may include a "Subject:" field that is intended to cause the user to take an action, such as the resetting of a password due to password expiration. In some embodiments, simulation server 202 may generate multiple instances of the simulated phishing message which may be delivered to a plurality of users of the organization. In an example, simulation server 202 may generate simulated phishing messages such that the "From:" and "Subject:" fields of each simulated phishing message are identical, while the "To:" field is adjusted according to the desired users. In an implementation, simulation server 202 may receive, retrieve, or otherwise access the simulated phishing emails storage 224 to generate the simulated phishing message to be sent to the plurality of users.

At step 304, in some implementations, simulation server 202 may create sim headers 288 with pop-up content and a predetermined identifier to be injected into the simulated phishing message. In implementations, simulation server 202 may create sim headers 288 including specification of content. Sim headers 288 refer to one or more X-headers. Further, the predetermined identifier may be an identifier that identifies the simulated phishing message as a known simulated phishing message generated by simulation server 202. Further, pop-up content may include customized text for simulation email client agent 238 to display to a recipient of the simulated phishing message if the recipient selects to report the simulated phishing message. In an example, simulation server 202 may create two sim headers 288. One sim header 288 for storing the predetermined identifier and other sim header 288 for storing the pop-up content.

At step 306, in some implementations, simulation server 202 may send the simulated phishing message with sim headers 288 to email client 236. The transmission of simulated phishing message from simulation server 202 to email client 236 may be performed in several ways which are well known in the art and need not be explained here.

At step 308, in some implementations, the user may identify the simulated phishing message as suspicious. In an implementation, the user identifying simulated phishing message as suspicious may be understood as the user selecting to report the simulated phishing message as a phishing email via client device user interface 232. The user may be referred to as a recipient. In an example, a UI element, such as a button may be provided in client device user interface 232. When the user receives the simulated phishing message and the user suspects that the simulated phishing message is a phishing email, then the user may click on the UI element to select to report the simulated phishing message as a phishing email.

At step 310, in some implementations, simulation email client agent 238 (also referred to as email client plug-in) may retrieve the simulated phishing message comprising sim headers 288 from email client 236. In an implementation, simulation email client agent 238 may retrieve the simulated phishing message on receiving an indication that the user selected to report the simulated phishing message as a phishing email. In an example, the functionality of simulation email client agent 238 may be triggered when the user clicks on the UI element to select to report the simulated phishing message.

Referring now to FIG. 3B which is a continuation of FIG. 3A, at step 312, in some implementations, simulation email client agent 238 may detect a header with the predetermined identifier. In an implementation, simulation email client agent 238 may extract the sim headers 288 from the simulated phishing message. Simulation email client agent 238 may further extract the sim header 288 from the sim headers 288 which includes the predetermined identifier. Subsequently, simulation email client agent 238 may parse the predetermined identifier from the sim header 288.

At step 314, in some implementations, simulation email client agent 238 may report the user's success at identifying the simulated phishing message as suspicious to simulation server 202. In an implementation, simulation email client agent 238 may analyze the header including the predetermined identifier to determine if the predetermined identifier belongs to the simulated phishing message generated by simulation server. Upon determining that the predetermined identifier belongs to the simulated phishing message generated by simulation server 202, simulation email client agent 238 may report the user's success in correctly identifying the simulated phishing message to simulation server 202.

At step 316, in some implementations, simulation server 202 may record the user's success and update a risk score for the user. The risk score may be a representation of a vulnerability of the user to a malicious attack. In one example, the user's response to each of a plurality of simulated phishing attacks may be associated with a success flag of 0 or 1 wherein a success flag of 1 may be assigned if the user successfully identifies a simulated phishing message as suspicious and a success flag of 0 may be assigned if the user fails to identify a simulated phishing message as suspicious. Over time, a plurality of such success flags for the user may be summed, averaged, filtered or counted in order to determine, for example, an overall frequency with which the user failed to detect the simulated phishing mail as suspicious. Such a measure is therefore representative of the vulnerability of the user to malicious attack and is one possible example of a user's risk score. Other ways to determine a user's risk score are possible and whilst not explicitly discussed, are contemplated herein. In an implementation, simulation server 202 may update the user's risk score stored in a database. The database may store risk scores of all users of the organization. In an implementation, data stored in the database may be analyzed by simulation server 202 to determine which users pose a security risk based on their risk scores and require cyber-security awareness training.

At step 318, in some implementations, simulation email client agent 238 may extract pop-up content from the sim header 288 which includes pop-up content or specification of content to get pop-up content. As described earlier, the pop-up content may include customized text for display to the user of the simulated phishing message if the user selects to report the simulated phishing message as a phishing message.

At step 320, in some implementations, simulation email client agent 238 may send the pop-up content to client device user interface 232 for display to the user.

At step 322, in some implementations, client device user interface 232 may display the pop-up content to the user on display 234. In an example, when the user or recipient of the simulated phishing message suspects that the simulated phishing message is a threat and the user selects to report the simulated phishing message, simulation email client agent 238 may determine the presence of the predetermined identifier. If simulation email client agent 238 is able to determine the presence of the predetermined identifier, then simulation email client agent 238 recognizes that the reported message is a simulated phishing message and not an actual threat. The simulation email client agent 238 then displays a pop-up window to the user to inform the user of his or her success in correctly identifying the simulated phishing message. The pop-up window may display customized text to the user based on the specification of content received from simulation server 202 in the sim headers 288.

Figure 4A:
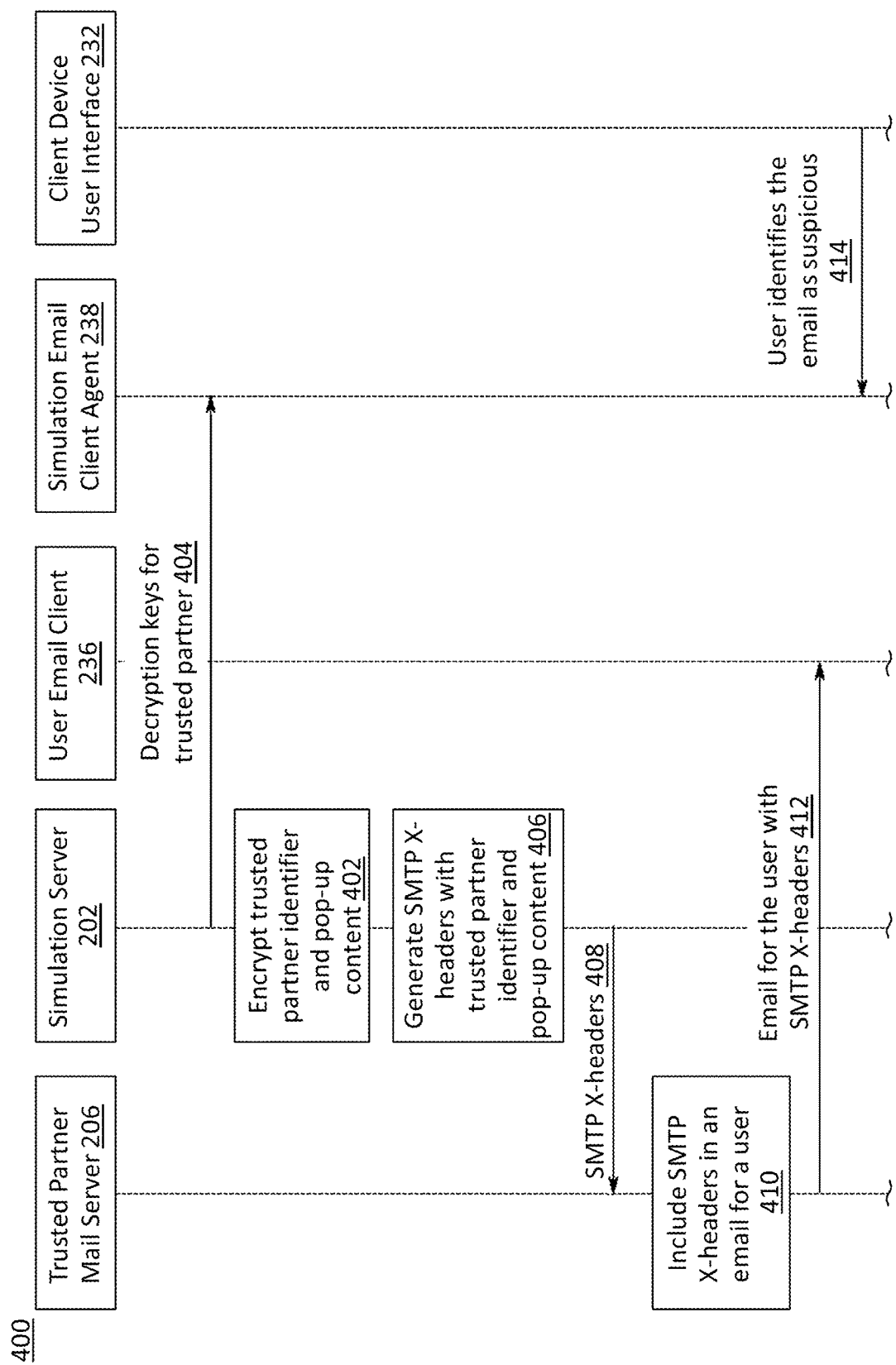
FIGS. 4A and 4B depict a flow chart for providing configurable responses to a user that has selected to report a message from a known trusted partner of an organization as a phishing email, according to some embodiments.
Figure 4B:
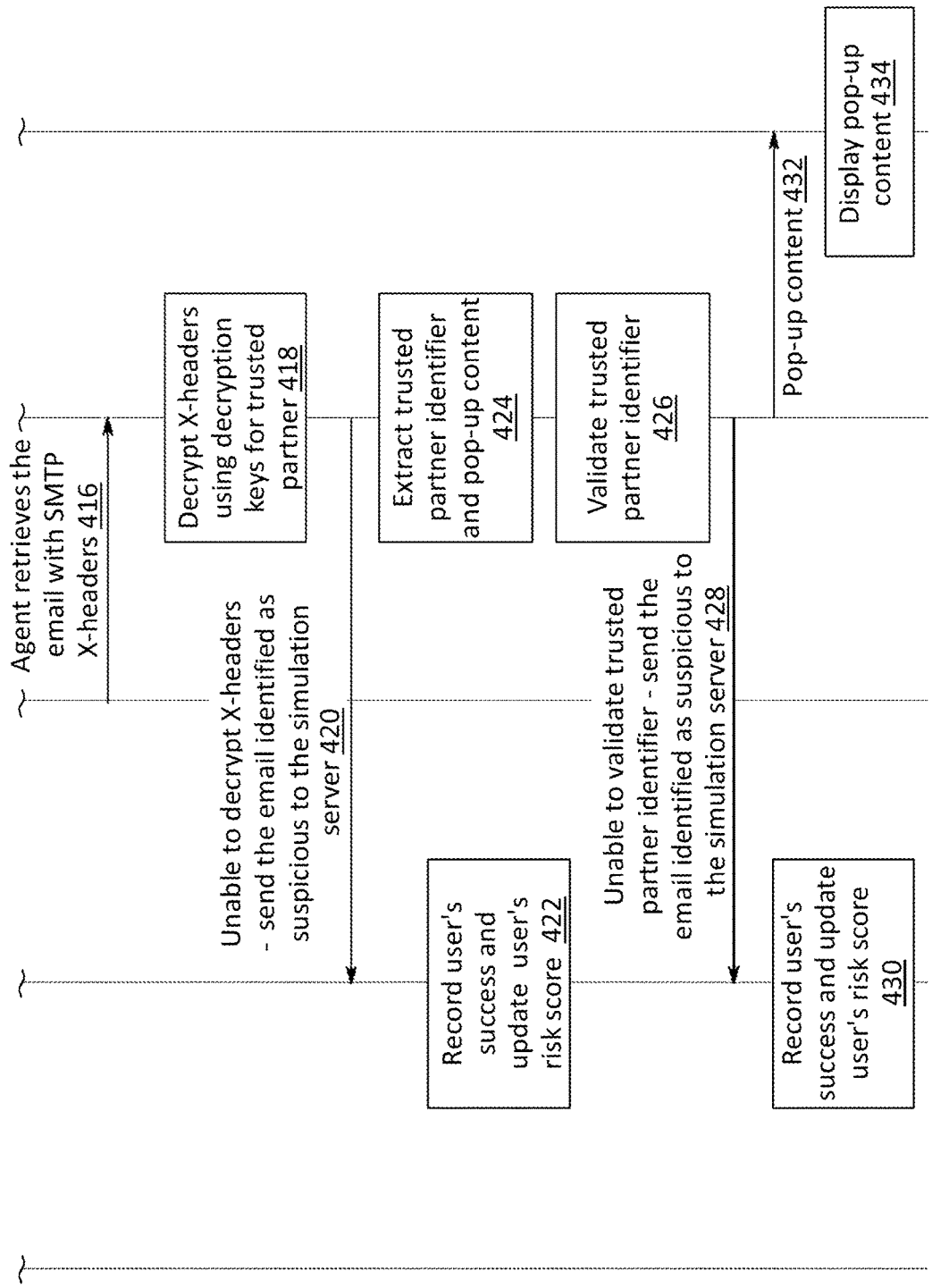

FIGS. 4A and 4B depict a flow chart 400 for providing configurable responses to a user that has selected to report a message from a known trusted partner of an organization as a phishing email, according to some embodiments.

At step 402, in some implementations, simulation server 202 may encrypt a trusted partner identifier and pop-up content. The trusted partner identifier may be understood as a pre-determined identifier for a trusted partner of an organization. Further, the pop-up content may include customizable text that may displayed to a user of an organization responsive to the user identifying an email as a phishing email. In an implementation, simulation server 202 may encrypt the trusted partner identifier and the pop-up content using one key, also referred to as encryption key, of a key pair for the trusted partner. Simulation server 202 may retrieve the key pair for the trusted partner from encryption key pairs storage 260. In an implementation, whenever a trusted partner of an organization wants to send out an email to users of the organization, it may include the trusted partner identifier and the pop-up content in the email. These may have been encrypted using the key of the key pair for the trusted partner (with the other key of the key pair for the trusted partner being known beforehand to the simulation email client agent 238). In implementations, simulation server 202 may perform the encryption and send the encrypted X-headers to trusted partner mail server 206. In implementations, simulation server 202 may send the key of the key pair for the trusted partner to trusted partner mail server 206 in order that trusted partner mail server 206 may itself perform the encryption of the X-headers.

At step 404, in some implementations, simulation server 202 may send the aforementioned other key, also referred to as a decryption key, of the key pair for the trusted partner to simulation email client agent 238. In an implementation, simulation server 202 may also share one or more group keys (also referred to as group decryption keys) with simulation email client agent 238. In one example, simulation server 202 may share a group key with simulation email client 238 that is associated with all trusted partners of the organization.

At step 406, in some implementations, simulation server 202 may generate SMTP X-headers with the trusted partner identifier and the pop-up content, for the trusted partner to include in their emails sent from their own mail server (for example trusted partner mail server 206). As may be understood, SMTP X-headers may be custom headers that allow simulation server 202 to include data, for example, the trusted partner identifier (that can be interpreted by simulation email client agent 238 to recognize the email as originating from the trusted partner) and the pop-up content. In an example, simulation server 202 may generate two SMTP X-headers, such as a first SMTP X-header and a second SMTP X-header. The first SMTP X-header may include the trusted partner identifier and the second SMTP X-header may include the pop-up content.

At step 408, in some implementations, simulation server 202 may send the SMTP X-headers to trusted partner mail server 206. The transmission of SMTP X-headers from simulation server 202 to trusted partner mail server 206 may be performed in several ways which are known in the art and need not be explained here.

At step 410, in some implementations, trusted partner mail server 206 may include the SMTP X-headers in an email that it needs to send out to a user of an organization that it is a trusted partner of so that if the user selects to report the email as a potential threat, simulation email client agent 238 can recognize that the email is from the trusted partner of the organization. In an example, trusted partner mail server 206 may inject SMTP X-headers in the email via Application Programming Interfaces (API) and/or via other known header injection techniques.

At step 412, in some implementations, trusted partner mail server 206 may send the email including SMTP X-headers to user email client 236. The transmission of the email comprising SMTP X-headers from trusted partner mail server 206 to user email client 236 may be performed in several ways which are known in the art and need not be explained here.

At step 414, in some implementations, the user may identify the simulated phishing message as suspicious. In an implementation, the user identifying the email as suspicious may be understood as the user selecting to report the email as a phishing email via client device user interface 232. In an example, when the user receives the email and the user suspects that the email is a phishing email, then the user may click on the UI element to report the email as a phishing email.

Referring now to FIG. 4B which is a continuation of FIG. 4A, at step 416, in some implementations, simulation email client agent 238 may retrieve the email comprising the SMTP X-headers from user email client 236. In an implementation, simulation email client agent 238 may retrieve the email on receiving an indication that the user selected to report the email as a phishing email. In an example, the functionality of simulation email client agent 238 may be triggered when the user clicks on the UI element to select to report the email.

At step 418, in some implementations, simulation email client agent 238 may decrypt the SMTP X-headers using decryption keys for trusted partners. As described earlier, simulation server 202 may share one key of the key-pair for the trusted partner with simulation email client agent 238. In an implementation, simulation email client agent 238 may try to decrypt the SMTP X-headers with each key. If simulation email client agent 238 is unable to decrypt the SMTP X-headers, then simulation email client agent 238 determines that the email cannot be from one of the trusted partners of the organization. On the other hand, if simulation email client agent 238 is able to decrypt the SMTP X-headers using one of the decryption keys, then simulation email client agent 238 determines that the email is from the trusted partner associated with the key that worked to decrypt the SMTP X-headers. In an example, simulation email client agent 238 may decrypt the SMTP X-headers using the decryption keys for trusted partners to determine if any of the decryption keys decrypts the SMTP X-headers and produces plain text.

At step 420, in some implementations, if simulation email client agent 238 is unable to decrypt the SMTP X-headers using the decryption keys for trusted partners, then simulation email client agent 238 may send the email identified as suspicious to simulation server 202. In an example, simulation email client agent 238 may report the user's success at identifying the email as suspicious to simulation server 202.

At step 422, in some implementations, simulation server 202 may record the user's success in correctly identifying the email as a phishing email. Further, simulation server 202 may update the user's risk score. In an implementation, simulation server 202 may update the user's risk score stored in a database. The database may store risk scores of all users of the organization. In an implementation, data stored in the database may be analyzed by simulation server 202 to determine which users pose a security risk based on their risk scores and require cybersecurity awareness training.

At step 424, in some implementations, simulation email client agent 238 may extract a trusted partner identifier and pop-up content, if present, from the SMTP X-headers. As described earlier, the trusted partner identifier may be understood as a pre-determined identifier for a trusted partner of an organization. Further, the pop-up content may include customizable text that may displayed to a user of an organization responsive to the user identifying an email as a phishing email.

At step 426, in some implementations, simulation email client agent 238 may validate the trusted partner identifier.

At step 428, in some implementations, if simulation email client agent 238 is unable to validate the trusted partner identifier, then simulation email client agent 238 may send the email identified as suspicious to simulation server 202. In an example, simulation email client agent 238 may report the user's success at identifying the email as suspicious to simulation server 202.

At step 430, in some implementations, simulation server 202 may record the user's success in correctly identifying the email as a phishing email. Further, simulation server 202 may update user's risk score. In an implementation, simulation server 202 may update the user's risk score stored in the database.

At step 432, in some implementations, simulation email client agent 238 may send pop-up content to client device user interface 232 for display to the user. In an example, if simulation email client agent 238 is unable to validate the trusted partner identifier, simulation email client agent 238 may determine that the email is likely a phishing email and may identify an appropriate content to display to the user, for example indicating that the email is a phishing email. If simulation email client 238 is able to validate the trusted partner identifier, simulation email client 238 may determine that the email is from a trusted partner and may identify an appropriate content to display to the user, for example indicating that it is safe to interact with or respond to the received email. Additionally, in this case, simulation email client agent 238 may cause user email client 236 to refrain from deleting the email, and/or to refrain from forwarding the email (for example to a threat management system or to an IR team) for threat assessment.

At step 434, in some implementations, client device user interface 232 may display the pop-up content to the user on display 234. In an example, when the user or recipient of the email suspects that the email is a threat, the user clicks on the UI element to select to report the email and simulation email client agent 238 may then validate the trusted partner identifier included in the SMTP X-headers of the email. If simulation email client agent 238 is unable to validate the trusted partner identifier, then simulation email client agent 238 may determine that the reported email is a phishing email. Simulation email client agent 238 may then cause a pop-up window to be displayed to the user to inform the user of his or her success in correctly identifying the email as a phishing email. If simulation email client agent 238 is able to validate the trusted partner identifier, then simulation email client agent 238 may determine that the reported email is safe and trusted. Simulation email client agent 238 may then cause a pop-up window to be displayed to the user to inform the user that the email has originated from a trusted partner and it is safe to interact with or respond to the email.

In some embodiments, steps 402 and 404 may be optional steps and can be performed by trusted partner mail server 206 as well.

Figure 5A:
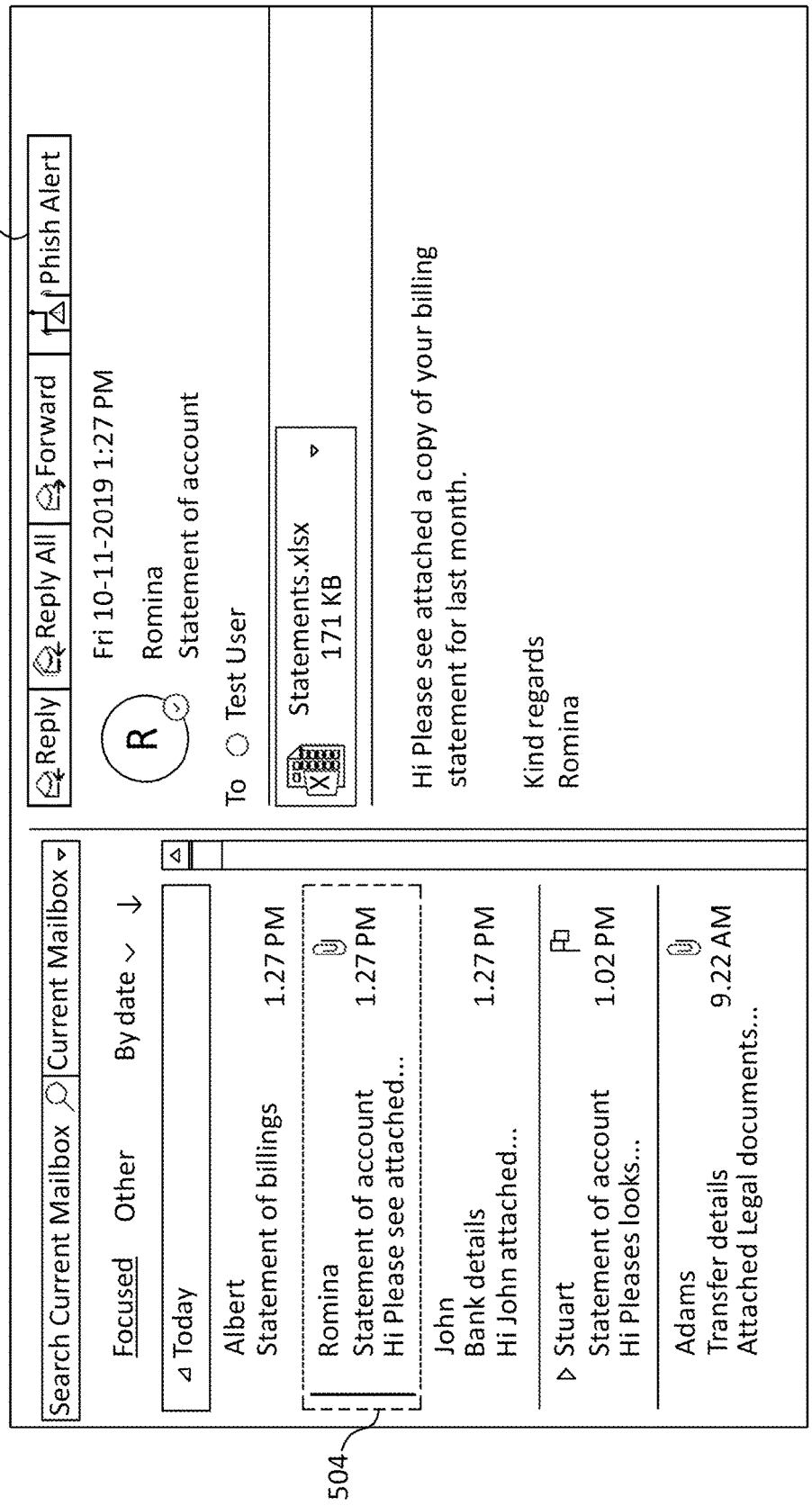
FIG. 5A shows a screenshot of a Phish Alert Button plug-in integrated into a user email client, according to some embodiments.

Referring to FIG. 5A in a general overview, FIG. 5A shows a screenshot 500 of a Phish Alert Button plug-in integrated into a user email client, according to some embodiments.

In some implementations simulation email client agent 238 may be installed in user email client 236. In one embodiment, simulation email client agent 238 may be pre-installed by the organization. Once installed, simulation email client agent 238 may provide a UI element such as a button in user email client 236. Functionality of simulation email client agent 238 may be triggered when the user clicks on the button while viewing an email. Some of the examples of simulation email client agent 238 that uses a UI button include, but are not limited to, a phish alert plug-in, a task create plug-in, a spam marking plug-in, an instant message plug-in and a search and a highlight plug-in.

As can be seen in FIG. 5A, simulation email client agent 238 providing a phish alert button plug-in is implemented into user email client 236. The phish alert button plug-in provides phish alert button 502. In an example implementation, the phish alert button plug-in may be pre-installed by the organization on user email client 236. In one example implementation, phish alert button 502 may be implemented in a ribbon area of an email. In another example implementation, phish alert button 502 may be implemented in a reading pane of user email client 236. In yet another example implementation, phish alert button 502 may be implemented in body of the email. Other example implementations of phish alert button 502 not discussed here are contemplated herein. In FIG. 5A, phish alert button 502 is shown to be implemented on the ribbon area of user email client 236. Phish alert button 502 may be understood as a UI component of an instance of the phish alert button plug-in that enables email client users, i.e., recipients of emails, to select to report suspicious emails that they believe are a threat to them or their organization. In an example, when a user receives email 504 and suspects that email 504 is a phishing email, then the user may click on phish alert button 502 to select to report email 504 as a phishing email. In the example of FIG. 5A, email 504 with subject 'Statement of account' is shown to include an excel file as an attachment. A user who is used to receiving emails with statements in the email body may find the email suspicious due to presence of the excel file attachment. Similarly, other users who may be trained to spot phishing emails may identify the email to be a phishing risk. Any user suspecting email 504 to be a phishing email, may select to report it by clicking on phish alert button 502. The user may be referred to as a recipient of the email or an email recipient.

Referring to FIGS. 5B-5E in a general overview, FIGS. 5B-5E show screenshots 500 of customized content in pop-ups displayed to a user of an organization responsive to the user selecting to report a simulated phishing email as a phishing email, according to some embodiments.

Figure 5B:
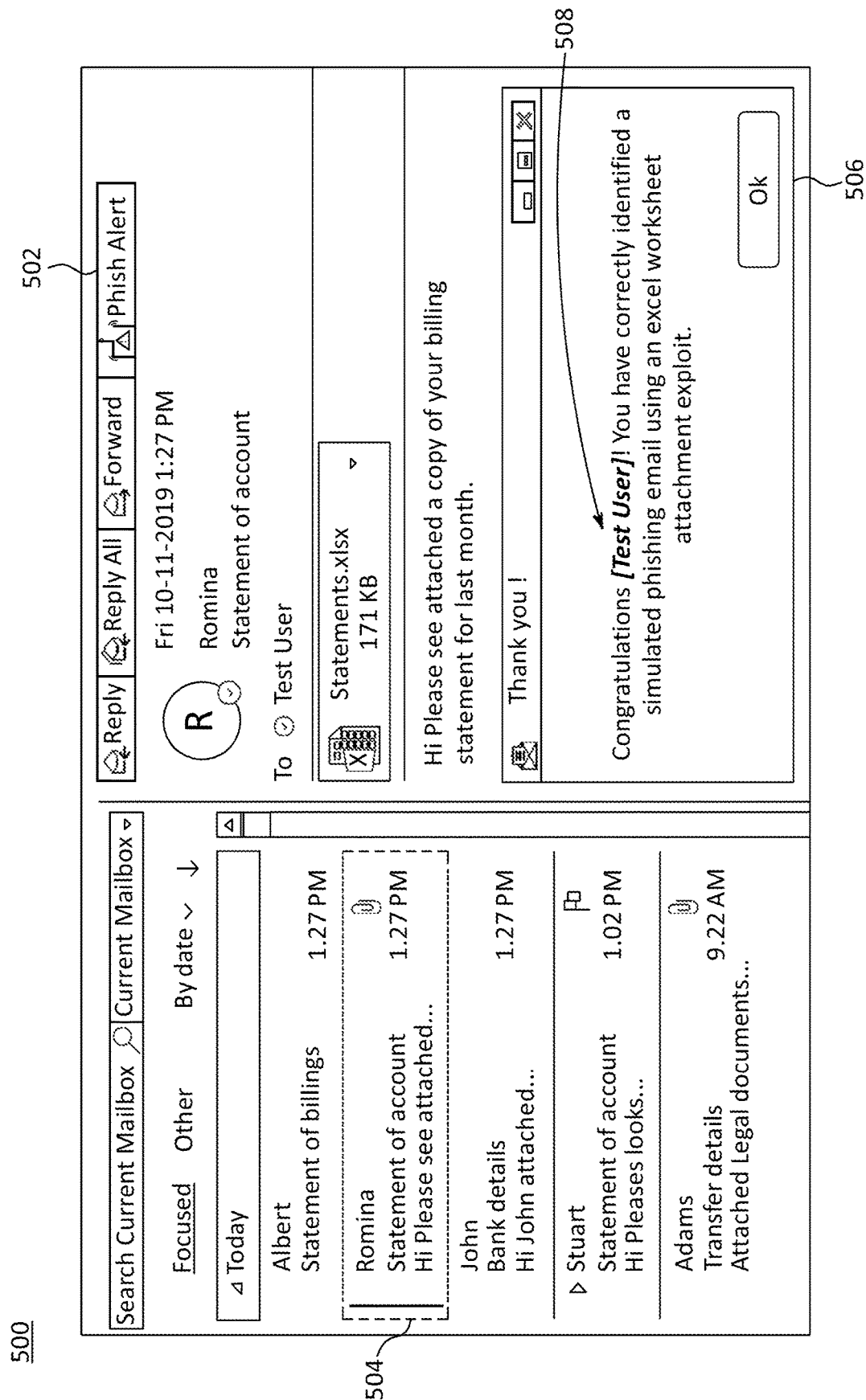
FIGS. 5B-5E illustrate screenshots of customized content in pop-ups displayed to a user of an organization responsive to the user selecting to report a simulated phishing email as a phishing email, according to some embodiments.

FIG. 5B is a continuation of FIG. 5A. Per FIG. 5A, the user may select to report email 504 as a phishing email by clicking on phish alert button 502. In implementations, when phish alert button 502 is activated by the user selecting to report the email 504, the phish alert button plug-in may attempt to identify specific information from the body and/or header of email 504. In an example, the specific information may refer to one or more X-headers that are recognizable by simulation email client agent 238 (which may for example be implemented as the phish alert button plug-in). The X-headers may include a predetermined identifier (that identifies email 504 as a known simulated phishing email generated by simulation server 202 of the organization) and customized content (specified for displaying to the user responsive to the user correctly identifying the email 504 as a potential threat). In response to identifying the predetermined identifier and the customized content specified for displaying, the phish alert button plug-in may determine that reported email 504 is a known simulated phishing email generated by simulation server 202. In response, the phish alert button plug-in may generate a message to be displayed based on the customized content specified in the X-headers. In an example, the customized content may include dynamic elements that may be populated by the phish alert button plug-in. An example of a dynamic element is a field in which the recipient's name or the organization's name may be inserted. Further, the message created by the phish alert button plug-in may be specific to the simulated phishing message referring to a type of exploit that the user recognized.

Referring to FIG. 5B, when phish alert button 502 is clicked by the user, a pop-up message 506 may be displayed to the user. As can be seen in FIG. 5B, pop-up message 506 reads "Congratulations [Test User]! You have correctly identified a simulated phishing email using an excel worksheet attachment exploit.". Pop-up message 506 may include a dynamic field 508. In one example implementation, dynamic field 508 may be populated by the phish alert button plug-in. The phish alert button plug-in may obtain and insert the name of the recipient of the email in dynamic field 508. Thus, the message created by the phish alert button plug-in is personalized for the user. Further, pop-up message 506 displayed to the user can reinforce training to the user related to the exploit in email 504.

Figure 5C:
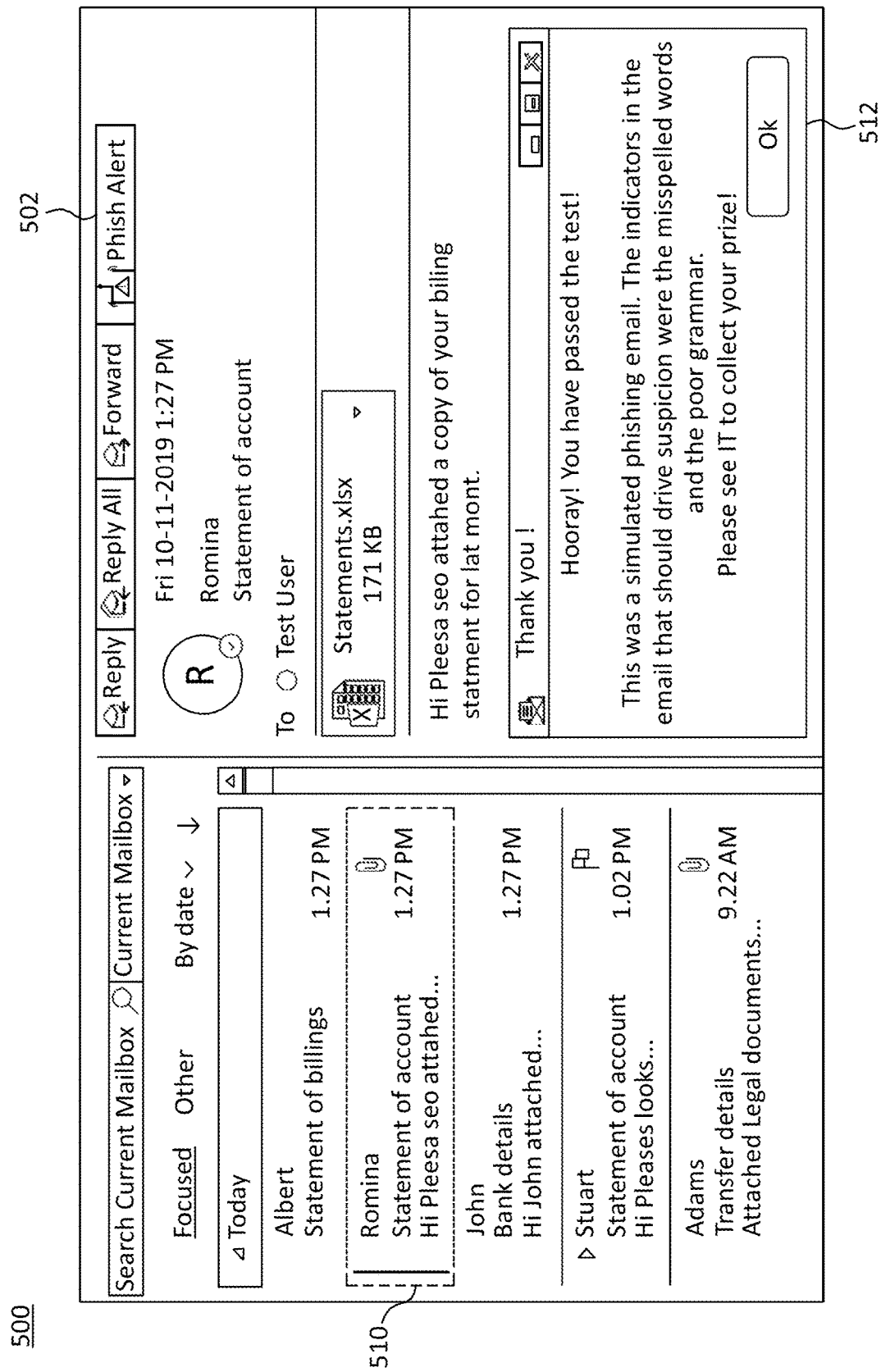

FIG. 5C illustrates an example of a message rendered by the phish alert button plug-in in response to the user selecting to report email 510 as a phishing email. In the example shown, the user may be in a corporate environment and may be used to receiving emails with good grammar. In the example, the user receives email 510 which contains misspelled words and poor grammar. In response, the user suspects email 510 to be a phishing attack because of its suspicious nature involving the misspelled words and poor grammar. With the safety of himself or herself and the organization in mind, the user may select to report email 510 using phish alert button 502. In response to selecting to report email 510 through phish alert button 502, the phish alert button plug-in may attempt to identify specific information within the body and/or header of email 510, such as a predetermined identifier that may be comprised within an SMTP extension header such as an X-header. The presence of the predetermined identifier may indicate that email 510 is a simulated phishing email. In the present example, the phish alert button plug-in successfully identifies the X-headers that include the predetermined identifier. Also, the phish alert button plug-in identifies another X-header including the content to display in response to identifying that email 510 is a simulated phishing email. Subsequently, the phish alert button plug-in generates a message comprising the content. As can be seen in FIG. 5C, pop-up message 512 reads "Hooray! You have passed the test! This was a simulated phishing email. The indicators in the email that should drive suspicion were the misspelled words and the poor grammar. Please see IT to collect your prize!" and is displayed to the user.

Figure 5D:
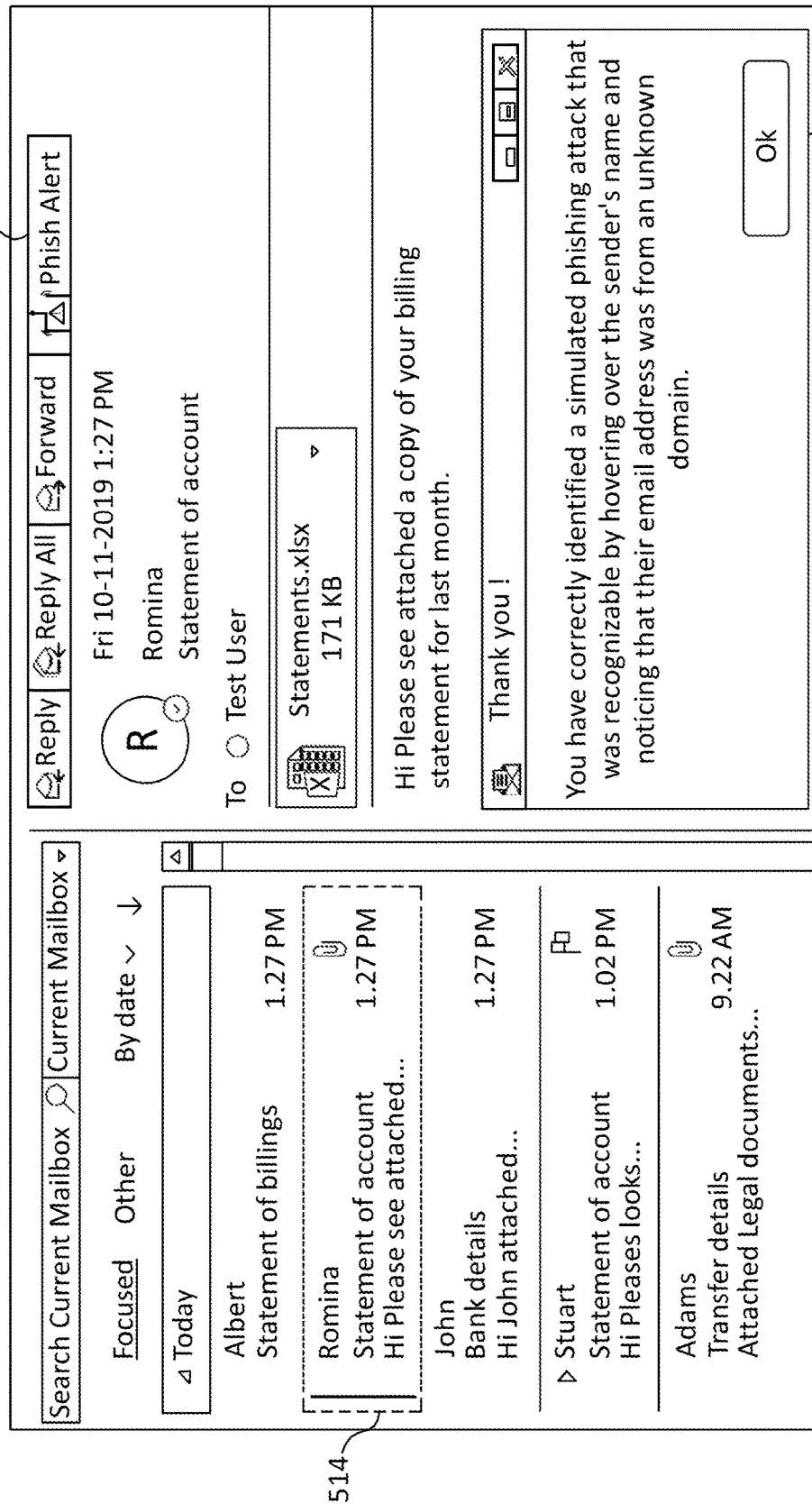

FIG. 5D illustrates an example of a message rendered by the phish alert button plug-in in response to the user selecting to report email 514 as a phishing email based on an unknown domain. In the example shown, when the user receives email 514, the user may hover over the sender's name and observe the sender's email address displayed on the screen. The user who may be trained in spotting phishing attacks may notice that sender's email address is from an unknown domain. Upon noticing that the sender's email address is from the unknown domain, the user may select to report email 514 using phish alert button 502. As described in earlier embodiments, the phish alert button plug-in may attempt to identify specific information within the body and/or header of email 514, such as a predetermined identifier that may be comprised within an SMTP extension header such as an X-header. The presence of the predetermined identifier may indicate that email 514 is a simulated phishing email. In the current example, the phish alert button plug-in successfully identifies the X-header that stores the predetermined identifier. Also, the phish alert button plug-in identifies another X-header storing the content to be displayed in the event that the user clicks the phish alert button 502 and the plug-in has determined that email 514 is a simulated phishing email. Subsequently the phish alert button plug-in generates a message comprising the content. As can be seen in FIG. 5D, the phish alert button plug-in displays a pop-up message 516 that reads "You have correctly identified a simulated phishing attack that was recognizable by hovering over the sender's name and noticing that their email address was from an unknown domain".

Figure 5E:
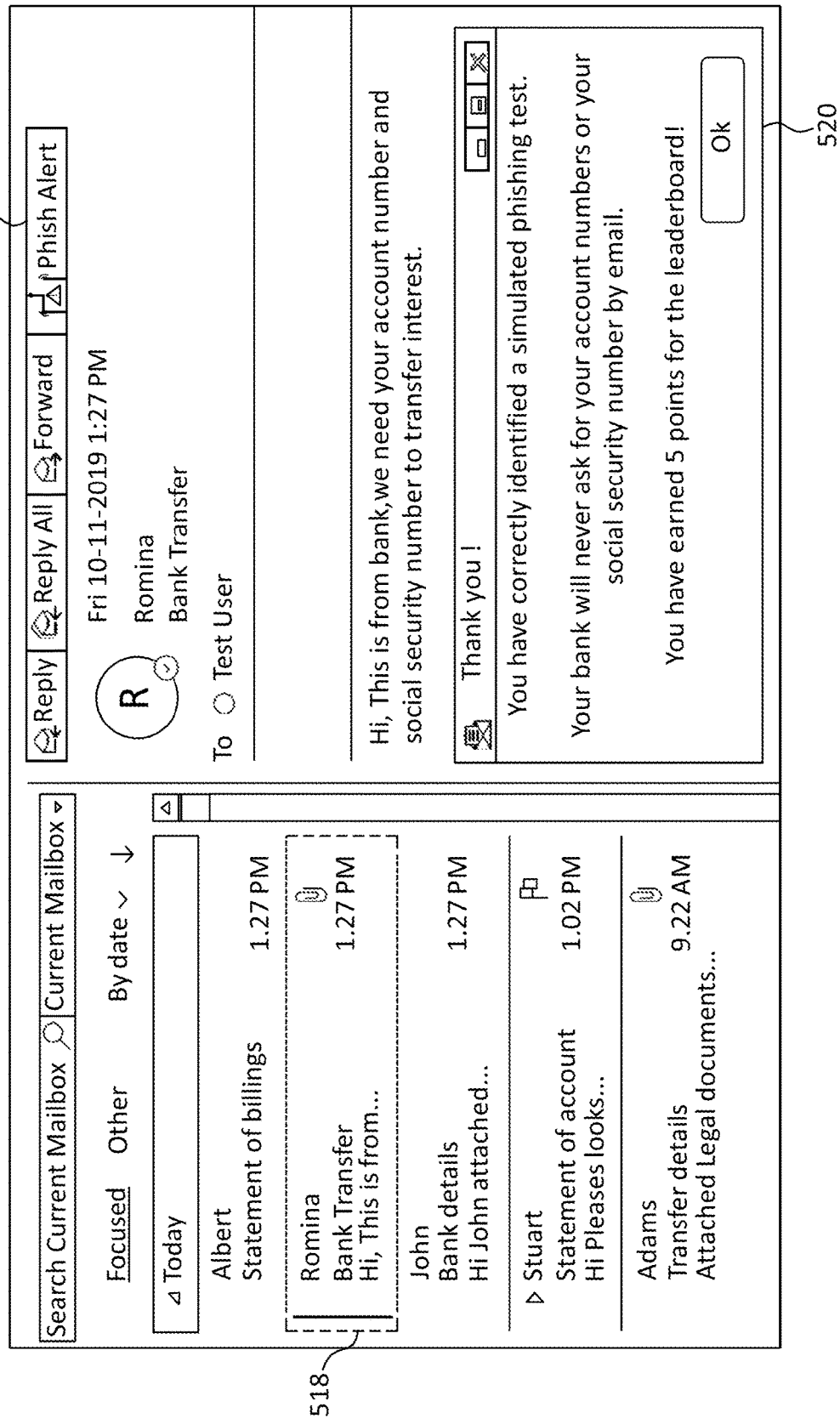

FIG. 5E illustrates an example of a message rendered by the phish alert button plug-in in response to the user selecting to report email 518 as a suspicious phishing email, according to some embodiments. Referring to FIG. 5E, when the user receives email 518 asking for an account number and a social security number of the user, the user may become suspicious and select to report email 518 using phish alert button 502. In response to the user selecting to report the email, the phish alert button plug-in may determine that the email is a simulated phishing email based on identifying an X-header having a predetermined identifier of the simulated phishing email. Subsequently, the phish alert button plug-in may identify another X-header storing the content to be displayed in the event that the user clicks the phish alert button 502 and the plug-in has determined that email 518 is a simulated phishing email. In response to the determining, the phish alert button plug-in may identify appropriate content to display. Subsequently the phish alert button plug-in may generate a message comprising the content. In the current example, as seen in FIG. 5E, the phish alert button plug-in displays a pop-up message 520 that reads "You have correctly identified a simulated phishing test. Your bank will never ask for your account numbers or your social security number by email. You have earned 5 points for the leaderboard!".

Figure 5F:
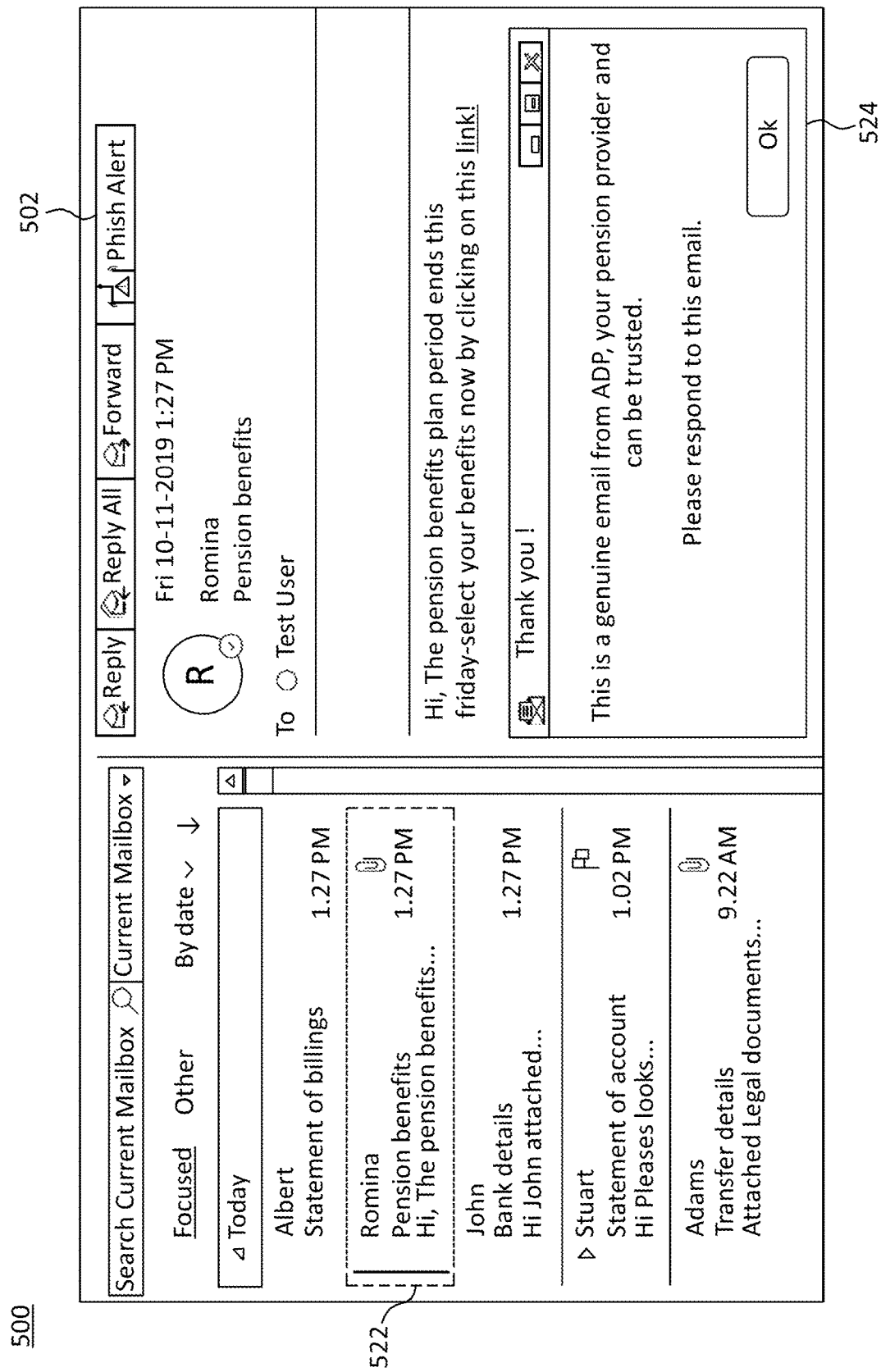
FIG. 5F illustrate a screenshot of customized content in a pop-up displayed to a user of an organization responsive to the user selecting to report an email from a trusted partner of the organization as a phishing email, according to some embodiments.

Referring to FIG. 5F in a general overview, FIG. 5F shows a screenshot 500 of customized content in a pop-up displayed to a user of an organization responsive to the user selecting to report an email from a trusted partner of the organization as a phishing email, according to some embodiments. In the example shown, the user may receive email 522 comprising an action item to complete a task via a link to a third-party website. For example, the organization's benefits administrator, such as ADP® may send email 522 comprising a message: "The pension benefits plan period ends this Friday—select your benefits now by clicking on this link!". The user, recognizing the urgency in tone and the prompt of the sender to click on a link (leading to external third-party website) may suspect a phishing attack. In response, the user may click on phish alert button 502 to select to report email 522. Responsive to the selecting to report email 522, the phish alert button plug-in may parse the email to determine whether it includes any headers that indicate that email 522 is either a simulated phishing email or a trusted email from an organization's trusted partner. In the present example, the phish alert button plug-in determines that the email is from a trusted partner based on identifying an X-header having a predetermined identifier for the trusted partner of the organization, i.e., ADP®. In response to the determining, the phish alert button plug-in may extract the predetermined identifier and determine the content from the X-headers for display. Further, the phish alert button plug-in may create a message for a pop-up to be displayed to the user based on the content included in or specified by the X-headers. In the present example, the phish alert button plug-in may create a message to inform the user that the reported email 522 is a safe message from the trusted partner of the organization and that the user should act on the email 522. As can be seen in FIG. 5F, a pop-up message 524 that reads "This is a genuine email from ADP, your pension provider and can be trusted. Please respond to this email" is displayed to the user.

Figure 6A:
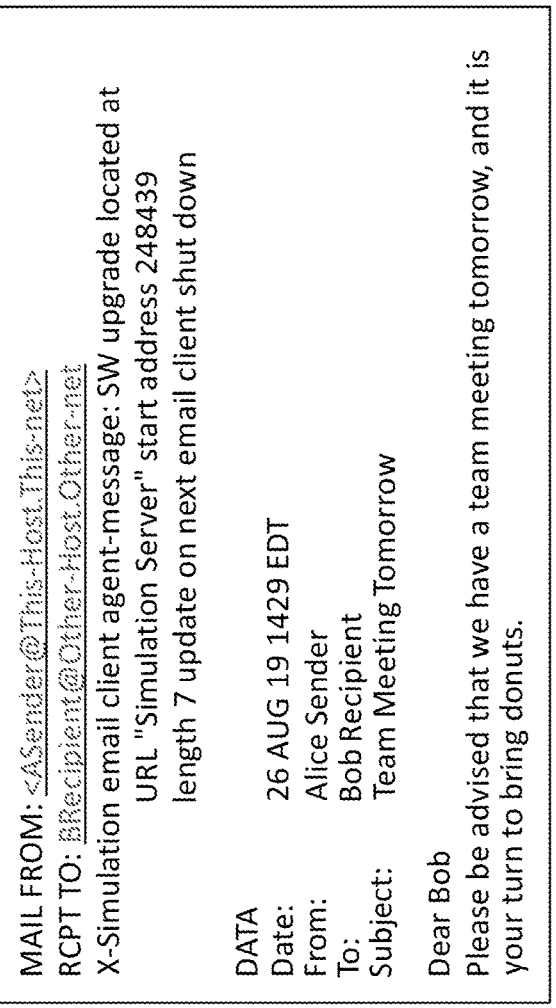
FIG. 6A depicts an example of a Simple Message Transfer Protocol (SMTP) message comprising specification of content, according to some embodiments.
Figure 6A:
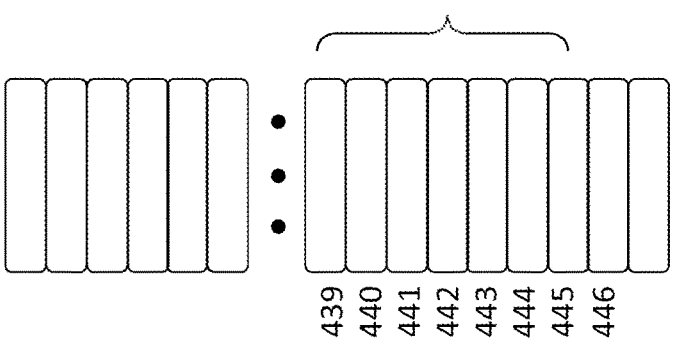

Referring to FIG. 6A, FIG. 6A depicts an example 600 of an SMTP message 610 comprising specification of content, according to some embodiments. The specification of content may comprise instructions for simulation email client agent 238 to perform certain actions. In an implementation, the specification of content may include instructions for simulation email client agent 238 to fetch an executable code and perform an autonomous update of the plug-in software.

In some implementations, the specification of content may specify a location (such as that of simulation server 202) from where simulation email client agent 238 may find the executable code. For example, the specification of content may specify a URL of simulation server 202. In an example, the executable code may be stored in an executable storage 614 of simulation server 202. The specification of content may further specify when simulation email client agent 238 should download the new executable code, and where it should store the new executable code for later access. In some examples, the specification of content may include a batch file that causes simulation email client agent 238 to begin a software update procedure. The specification of content may also include the time when simulation email client agent 238 should run the batch file to initiate the software update process. In an example, the time may be an absolute time, such as. 11:59 p.m. on a given day. In another example, the time may be a time of day, such as 11:59 p.m. on the day the specification of content is received. In yet another example, the update timing may be relative to an event, such as an opening or closing of user email client 236. As can be seen in FIG. 6A, SMTP message 610 includes an X-header comprising specification of content. In the example shown, the specification of content includes an instruction for simulation email client agent 238 to fetch an executable code from simulation server 202 at URL "Simulation Server" starting at storage address 248439 for length 7 and to perform an autonomous software update when user email client 236 is next closed. In an example, the executable code may be stored in the executable storage of simulation server 202.

Although, it is shown that the specification of content includes the location of the new executable code from where simulation email client agent 238 can fetch the new executable code, in some implementations, simulation server 202 may include the new executable code itself in an X-header of SMTP message 610. In such scenarios, once SMTP message 610 has been received, simulation email client agent 238 is enabled to update itself without needing further online connectivity to obtain the executable code. In some further implementations, instead of specifying the location of simulation server 202, for example the URL of simulation server 202, the specification of content may include instructions to access a cloud-based server based on an identifier in SMTP message 610, and to then download the instructions from the cloud-based server to determine what to do based on the identified message. In examples, the URL to the cloud-based server may be configured as part of simulation email client agent 238 such that the X-header contains a directive to simulation email client agent 238, and not the URL of simulation server 202.

Referring again to FIG. 6A, unidentified boundaries may be put around a given portion of text of the X-header to hide it from view from the user of user email client 236 as user email client 236 may not be aware of how to display it. Further, this enables simulation server 202 to send confidential attachments that only simulation email client agent 238 can interpret or obtain.

Referring to FIG. 6B, FIG. 6B depicts another example 600 of an SMTP message 620 comprising a specification of content, according to some embodiments. The specification of content comprises instructions for simulation email client agent 238 to perform certain actions.

FIG. 6B describes the same process as FIG. 6A, except that the specification of content is included in a MIME header or a MIME attachment that is inserted into SMTP message 620 and may not be visible to the recipient of SMTP message 620 or to the user of email client 236. The Content-type "plug-in/channel" is not a known MIME content type. Thus, it may not be possible for a standard MIME compatible email client to recognize this content type. As a result, user email client 236 would not display the text that is included in the boundary for "Instructions" to the recipient of SMTP message 620. Thus, by having additional information in the email (such as SMTP message 620) in a format that is not shown to the email recipient, it is possible for simulation server 202 to communicate with simulation email client agent 238.

Further, as can be seen in FIG. 6B, the second body part of SMTP message 620 includes a file attachment. Since the file attachment is an ASCII text file, it is sent with no encoding and its content-type is given as text/plain. The "Content-Disposition: attachment" header has a parameter, "filename=", which specifies a suggested name for the file. This header specifies that this body part is to be treated as a file and saved on local storage under the suggested file name instead of being displayed to the email recipient.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

We claim:

1. A method comprising:
   (a) generating, by a simulation server, a simulated phishing email having one or more Simple Mail Transfer Protocol (SMTP) extension headers comprising a predetermined identifier that identifies the simulated phishing email as a known simulated phishing email generated by the simulation server, and specification of content to display to an email client of a user of an entity responsive to the user of an entity identifying via the email client the simulated phishing email as a phishing email;
   (b) communicating, by the simulation server via SMTP, the simulated phishing email to email accounts of a plurality of users of the entity;
   (c) receiving, by an agent of the email client of the user of the plurality of users of the entity, an indication that the user selected via a user interface element presented via the email client to report as a phishing email the simulated phishing email received at the user's email account;
   (d) determining, by the agent of the email client, that the reported email is a known simulated phishing email generated by the simulation server based on the presence of the predetermined identifier in the one or more SMTP extension headers;
   (e) generating, by the agent of the email client responsive to the user identifying via the email client the simulated phishing email as the phishing email, a message using the content specified from the one or more SMTP extension headers in the simulated phishing email; and
   (f) sending, by the agent of the email client responsive to the determination, the generated message to a display for presentation.

2. The method of claim 1, further comprising one or more of deleting, by the agent, the simulated phishing email or communicating, by the agent, to the simulation server that the simulated phishing email was reported by the user as a phishing email.

3. The method of claim 1, wherein a first SMTP extension header of the one or more SMTP extension headers includes the predetermined identifier and a second SMTP extension header of the one or more SMTP extension headers includes the specification of content.

4. The method of claim 1, wherein the specification of content comprises dynamic fields to be determined and populated by the agent.

5. The method of claim 1, wherein the specification of content comprises a pointer to a storage of messages comprising content.

6. The method of claim 1, wherein the specification of content identifies content on one of a type or a category of phishing attack.

7. The method of claim 1, wherein the specification of content may identify content on a level of one of a user, a template, a campaign or an organization.

8. A method comprising:
   (a) generating, by a simulation server, one or more Simple Mail Transfer Protocol (SMTP) extension headers for the entity, comprising a predetermined identifier that identifies an email as being from a trusted partner of the entity, and specification of content to display to an email client of a user of the entity responsive to the user identifying via the email client an email as a phishing email;
   (b) sending, by the simulation server to the mail server of the trusted partner of the entity, the one or more SMTP extension headers to be added, by the mail server of the trusted partner of the entity via SMTP, to emails sent to email accounts of a plurality of users of the entity;
   (c) receiving, by an agent of the email client of the user of the plurality of users of the entity, an indication that the user selected via a user interface element presented via the email client to report as a phishing email an email received at the user's email account from the mail server of the trusted partner of the entity;
   (d) determining, by the agent of the email client, that the reported email is an email received from a trusted partner of the entity based on the presence of the predetermined identifier in the one or more SMTP extension headers;
   (e) generating, by the agent of the email client responsive to the user identifying via the email client the simulated phishing email as the phishing email, message using the content specified from the one or more SMTP extension headers in the simulated phishing email; and
   (f) sending, by the agent of the email client responsive to the determination, the generated message to a display for presentation.

9. The method of claim 8, further comprising enabling, by the agent responsive to determining the reported email is an email received from the trusted partner of the entity, the user to take action on the reported email without notifying the simulation server of the reported email.

10. The method of claim 8, wherein generating by the simulation server one or more SMTP extension headers for the trusted partner of the entity further comprises encrypting the predetermined identifier that identifies an email as being from the trusted partner of the entity.

11. A system comprising:
   one or more processors, coupled to memory of a simulation server configured to:
     generate a simulated phishing email having one or more Simple Mail Transfer Protocol (SMTP) extension headers comprising a predetermined identifier that identifies the simulated phishing email as a known simulated phishing email generated by the simulation server, and specification of content to display to an email client of a user responsive to the user identifying via the email client the simulated phishing email as a phishing email;
     communicate via SMTP, the simulated phishing email to email accounts of a plurality of users of the entity;
   an agent of the email client of the user of the plurality of users, the agent of the email client configured to:
     receive an indication that the user selected via a user interface element presented via the email client to report the simulated phishing email received at the user's email account as a phishing email;
     determine that the simulated phishing email is a known simulated phishing email generated by the simulation server based on presence of the predetermined identifier in the one or more SMTP extension headers;
     generate, responsive to the user identifying the simulated phishing email as the phishing email a message using the content specified from the one or more SMTP extension headers in the simulated phishing email; and send, responsive to the determination, the generated message to a display for presentation.

12. The system of claim 11, wherein the agent is further configured to delete the simulated phishing email and communicate to the simulation server that the simulated phishing email was correctly identified by the user.

13. The system of claim 11, wherein a first SMTP extension header of the one or more SMTP extension headers includes the predetermined identifier and a second SMTP extension header of the one or more SMTP extension headers includes the specification of content.

14. The system of claim 11, wherein the specification of content comprises dynamic fields to be determined and populated by the agent.

15. The system of claim 11, wherein the specification of content comprises a pointer to a storage of messages comprising content.

16. The system of claim 11, wherein the specification of content identifies content on one of a type or a category of phishing attack.

17. The system of claim 11, wherein the specification of content may identify content on a level of one of a user, a template, a campaign or an organization.

18. A system comprising:

one or more processors, coupled to memory of a simulation server configured to:

generate one or more Simple Mail Transfer Protocol (SMTP) extension headers for an entity, comprising a predetermined identifier that identifies an email as being from a trusted partner of the entity, and specification of content to display to an email client of a user of the entity responsive to the user identifying via the email client an email as a phishing email;

communicate to the mail server of the trusted partner of the entity, the one or more SMTP extension headers to be added, by the mail server of the trusted partner of the entity to emails sent via SMTP to email accounts of a plurality of users of the entity;

an agent of the email client of the user of the plurality of users, the agent of the email client configured to:

receive an indication that the user selected via a user interface element presented via the email client to report as a phishing email an email received at the user's email account from the mail server of the trusted partner of the entity;

determine that the reported email is an email received from a trusted partner of the entity based on presence of the predetermined identifier in the one or more SMTP extension headers;

generate, responsive to the user identifying the simulated phishing email as the phishing email, a message comprising the content specified from the one or more SMTP extension headers in the simulated phishing email; and send, responsive to the user selecting the user interface element, the generated message to a display for presentation by the display.

19. The system of claim 18, wherein the agent, responsive to determining the reported email is an email received from the trusted partner of the entity, is further configured to enable the user to take action on the reported email without notifying the simulation server of the reported email.

20. The system of claim 18, wherein the simulation server is further configured to encrypt the predetermined identifier that identifies an email as being from the trusted partner of the entity.

* * * * *